(12) United States Patent
Ohba et al.

(10) Patent No.: US 10,805,528 B2
(45) Date of Patent: Oct. 13, 2020

(54) IMAGE CAPTURING APPARATUS, INFORMATION PROCESSING SYSTEM, INFORMATION PROCESSING APPARATUS, AND POLARIZED-IMAGE PROCESSING METHOD

(71) Applicant: SONY INTERACTIVE ENTERTAINMENT INC., Tokyo (JP)

(72) Inventors: Akio Ohba, Kanagawa (JP); Hidehiko Ogasawara, Tokyo (JP); Akihiko Sugawara, Kanagawa (JP); Hiroyuki Segawa, Kanagawa (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/337,025

(22) PCT Filed: Sep. 27, 2017

(86) PCT No.: PCT/JP2017/035059
§ 371 (c)(1),
(2) Date: Mar. 27, 2019

(87) PCT Pub. No.: WO2018/066440
PCT Pub. Date: Apr. 12, 2018

(65) Prior Publication Data
US 2019/0230281 A1   Jul. 25, 2019

(30) Foreign Application Priority Data

Oct. 4, 2016 (JP) .................................. 2016-196785

(51) Int. Cl.
*H04N 5/232* (2006.01)
*G06T 7/70* (2017.01)
*H04N 7/04* (2006.01)
*G06T 1/00* (2006.01)
*G06F 3/01* (2006.01)
*A63F 13/23* (2014.01)
*A63F 13/213* (2014.01)
(Continued)

(52) U.S. Cl.
CPC .......... *H04N 5/23232* (2013.01); *G06T 1/00* (2013.01); *G06T 7/70* (2017.01); *H04N 7/04* (2013.01);
(Continued)

(58) Field of Classification Search
None
See application file for complete search history.

(56) References Cited

U.S. PATENT DOCUMENTS

2008/0186390 A1   8/2008   Sato et al.
2011/0018990 A1   1/2011   Komoto et al.
(Continued)

FOREIGN PATENT DOCUMENTS

EP   0999518      5/2000
JP   2009-58533   3/2009
(Continued)

OTHER PUBLICATIONS

International Search Report and Written Opinion dated Nov. 21, 2017, from International Application No. PCT/JP2017/035059, 9 sheets.
(Continued)

*Primary Examiner* — Quan Pham
(74) *Attorney, Agent, or Firm* — Katten Muchin Rosenman LLP

(57) ABSTRACT

An image data generating block 72 of an image capturing apparatus 12 generates polarized images having two or more resolutions from luminance of polarization in two or more directions acquired by a luminance data acquiring block 70. A pixel value converting block 74 generates new image data with a predetermined parameter being a pixel value on the basis of the polarized luminance in two or more directions. A transmission image generating block 76 connects image data of two or more types on a predetermined pixel line basis
(Continued)

and then crops the requested data, thereby stream-transferring the cropped data from a communication block 78. A target object recognizing block 80 of an information processing apparatus 10 recognizes the state of a target object by use of the transmitted data and an output data generating block 82 generates output data by use of the recognized state. A communication block 86 requests the image capturing apparatus 12 for the data including type, resolution, and region corresponding to the state of the target object.

17 Claims, 19 Drawing Sheets

(51) Int. Cl.
*H04N 5/225* (2006.01)
*G06F 3/0346* (2013.01)
(52) U.S. Cl.
CPC ............ *A63F 13/213* (2014.09); *A63F 13/23* (2014.09); *A63F 2300/1025* (2013.01); *A63F 2300/1087* (2013.01); *G06F 3/011* (2013.01); *G06F 3/0346* (2013.01); *G06T 2207/20132* (2013.01); *G06T 2207/20212* (2013.01); *H04N 5/2254* (2013.01)

(56) References Cited

U.S. PATENT DOCUMENTS

| 2011/0050854 | A1 | 3/2011 | Kanamori et al. |
| 2012/0206581 | A1* | 8/2012 | Kanamori ............ G02B 27/286 348/68 |
| 2013/0010106 | A1* | 1/2013 | Yokota .................. G01C 3/085 348/135 |
| 2014/0078265 | A1* | 3/2014 | Ohba .................... H04N 13/239 348/47 |
| 2016/0080645 | A1 | 3/2016 | Ohba et al. |
| 2016/0210754 | A1 | 7/2016 | Ida et al. |
| 2016/0267348 | A1 | 9/2016 | Kondo |

FOREIGN PATENT DOCUMENTS

| JP | 2012-80065 | | 4/2012 |
| JP | 2012-212978 | A | 11/2012 |
| JP | 2015-115041 | A | 6/2015 |
| JP | 2016-063537 | A | 4/2016 |
| JP | 2016-133396 | A | 7/2016 |
| WO | 02/09424 | A2 | 1/2002 |
| WO | 2007/139067 | A1 | 12/2007 |
| WO | 2010-073547 | A1 | 7/2010 |
| WO | 2010/079557 | A1 | 7/2010 |

OTHER PUBLICATIONS

Gary Atkinson and Edwin R. Hancock, "Recovery of Surface Orientation from Diffuse Polarization," IEEE Transactions on Image Processing, Jun. 2006, 15(6), pp. 1653-1664.

International Preliminary Report on Patentability dated Apr. 9, 2019, from International Application No. PCT/JP2017/035059, 14 sheets.

Notification of Reason for Refusal dated Oct. 29, 2019, from Japanese Patent Application No. 2016-196785, 7 sheets.

* cited by examiner

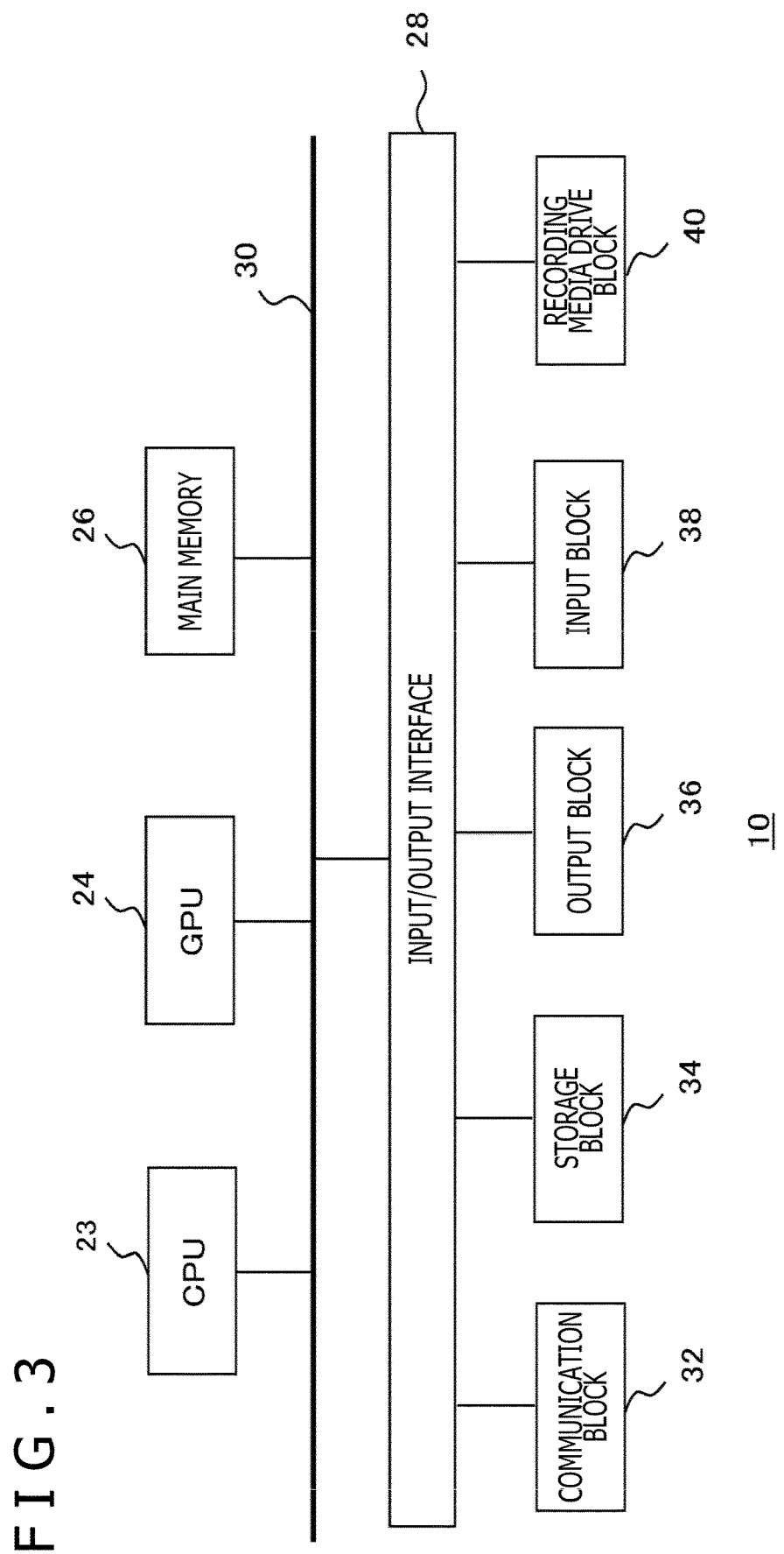
F I G . 3

IMAGE CAPTURING APPARATUS, INFORMATION PROCESSING SYSTEM, INFORMATION PROCESSING APPARATUS, AND POLARIZED-IMAGE PROCESSING METHOD

TECHNICAL FIELD

The present invention relates to a technology for executing information processing in accordance with the movement of a target object.

BACKGROUND ART

A game is known in which a display image obtained by capturing such a part of the body as the head of a user with a video camera, extracting a predetermined area such as the eye, the mouth, or the hand, and the extracted predetermined part is replaced by another image (refer to PTL 1, for example). Also, a user interface system is known in which a movement of a mouth or a hand captured with a video camera is received as a command for manipulating an application. The technologies such as mentioned above of capturing a real world and displaying a virtual world that responds to the movement of the captured real world and using the virtual world for some information processing is used in wide fields from small-sized mobile terminals to amusement facilities regardless of the scales thereof.

CITATION LIST

Patent Literature

[PTL 1]
European Published Patent No. EP0999518

SUMMARY

Technical Problems

The image analysis in which the position and attitude of a target object from captured images easily involves a problem of the instability in the accuracy of processing due to the external view, position, or image capturing environment of a target object. For example, in a general technology in which feature points are used for the extraction or matching of an image of a target object from a captured image thereof, the accuracy in processing is deteriorated due to the originally insufficient number of feature points of a target object or the small apparent size thereof because of the distance from a camera. As the robustness in the processing accuracy is desired, it becomes necessary to make finer the granularity of processing in space and time or make a necessary algorithm complex, thereby inviting the compression of transfer band or the increase in processing load. The resultant latency especially presents a problem in the use of the camera as user interface.

Therefore, the present invention addresses the above-identified and other problems and solves the addressed problems by providing a technology that provides the acquisition of states of a target object from captured images thereof with accuracy and efficiency.

Solution to Problems

In carrying out the invention and according to one aspect thereof, there is provided an image capturing apparatus. The image capturing apparatus includes an image data acquiring block configured to acquire data of polarized images in a plurality of directions and generate data each expressed by a plurality of resolutions, a pixel value converting block configured to acquire a predetermined parameter by use of a pixel value of the above-mentioned polarized images and generate data that is a new pixel value, and a communication block configured to send at least one of the generated data to an information processing apparatus.

In carrying out the invention and according to another aspect thereof, there is provided an information processing system. The information processing system includes an image capturing apparatus configured to capture a polarized image of a target object; and an information processing apparatus configured to acquire a state of a target object by use of information acquired from a polarized image concerned and execute information processing based thereof. The above-mentioned image capturing apparatus includes an image data acquiring block configured to acquire data of polarized images in a plurality of directions and generate data each expressed by a plurality of resolutions, a pixel value converting block configured to acquire a predetermined parameter by use of a pixel value of the above-mentioned polarized images for each of the above-mentioned plurality of resolutions and generate data that is a new pixel value, and a communication block configured to send at least one of the generated data to an information processing apparatus. The above-mentioned information processing apparatus includes a target object recognizing block configured to acquire a state of a target object by use of data sent from the above-mentioned image capturing apparatus and a communication block configured to specify a type in accordance with an acquired state of a target object and a region on an image plane so as to execute a transmission request for data to the above-mentioned image capturing apparatus.

In carrying out the invention and according to still another aspect thereof, there is provided an information processing apparatus. The information processing apparatus includes a communication block configured to acquire, from an image capturing apparatus for capturing a polarized image of a target object, requested one of data of data of a polarized image and data with a predetermined parameter acquired by use of a pixel value of a polarized image being a pixel value, a target object recognizing block configured to acquire a state of a target object by use of the acquired data, and an output data generating block configured to generate output data by executing information processing on a basis of a state of the above-mentioned target object. The above-mentioned communication block specifies a type in accordance with a state of the above-mentioned target object and a region on an image plane so as to execute a transmission request for data to the above-mentioned image capturing apparatus.

In carrying out the invention and according to yet another aspect thereof, there is provided a polarized image processing method to be executed by an image capturing apparatus. The polarized image processing method includes the steps of acquiring data of polarized images in a plurality of directions by an image capturing device and to generate data each expressed by a plurality of resolutions, acquiring a predetermined parameter by use of a pixel value of the above-mentioned polarized images for each of the above-mentioned plurality of resolutions and to generate data that is a new pixel value, and sending at least one of the generated data to an information processing apparatus.

It should be noted that any combinations of above-mentioned components and the expressions of the present invention as converted between a method, an apparatus, a system, a computer program, and a computer program recording medium are also valid as modes of the present invention.

Advantageous Effect of Invention

According to the present invention, a state of a target object can be highly accurately and efficiently acquired from a captured image.

BRIEF DESCRIPTION OF DRAWINGS

FIG. 3 is a diagram illustrating an internal circuit configuration of an information processing apparatus according to the present embodiment.

DESCRIPTION OF EMBODIMENTS

Figure 1:
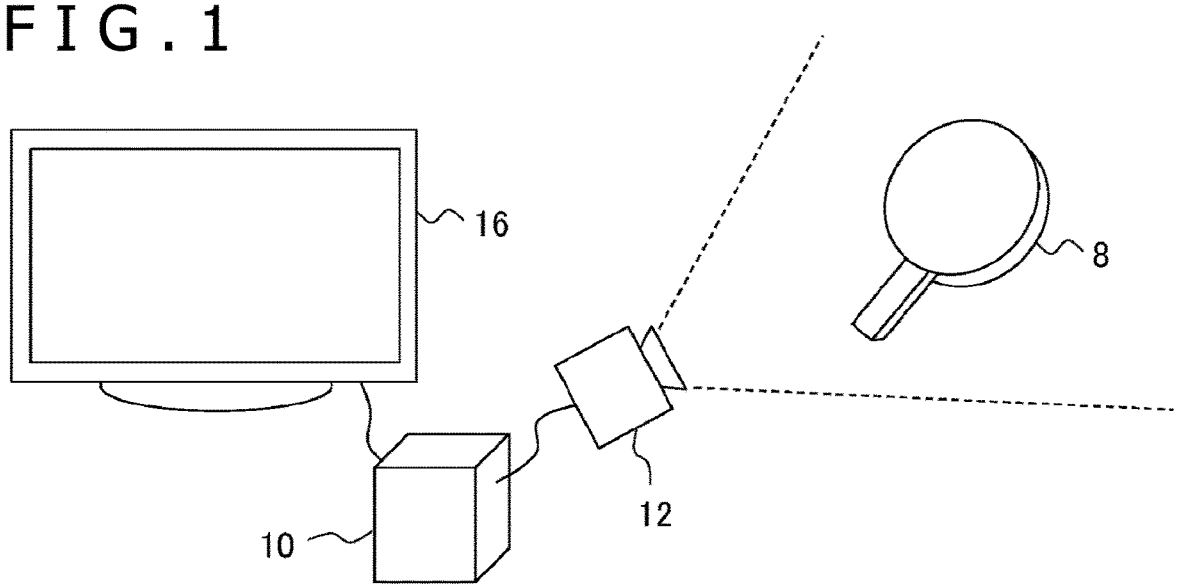
FIG. 1 is a diagram illustrating a configurational example of an information processing system according to the present embodiment.

FIG. 1 is a diagram illustrating a configurational example of an information processing system according to the present embodiment. This information processing system has an image capturing apparatus 12 for capturing a target object 8 at a predetermined frame rate, an information processing apparatus 10 for executing information processing on the basis of the information obtained from a captured image, and a display apparatus 16 for outputting results of the information processing.

The information processing system may further have an input apparatus through which a manipulation done by a user on the information processing apparatus 10 is inputted. Still further, the information processing apparatus 10 may be communicable with external apparatuses such as a server through connection with a network such as the Internet.

The information processing apparatus 10, the image capturing apparatus 12, and the display apparatus 16 may be interconnected with a cable or in a wireless connection such as wireless local area network (LAN). It is also practicable to combine any two or more of the information processing apparatus 10, the image capturing apparatus 12, and the display apparatus 16 into a single unit of apparatus. For example, a camera or mobile terminal that has the above-mentioned apparatuses may be realize the information processing system. Alternatively, the display apparatus 16 may be in the form of a head-mounted display that is worn on the head of a user to display an image in front of the eyes of the user and this head-mounted display may have the image capturing apparatus 12 so as to capture an image corresponding to the line-of-sight of the user. In any case, the external shapes of the information processing apparatus 10, the image capturing apparatus 12, and the display apparatus 16 are not restricted to those illustrated in the figure.

In the system described above, the information processing apparatus 10 sequentially acquires any one of the data of an image captured by the image capturing apparatus 12 at a predetermined frame rate and the various types of data acquired from this image, thereby identifying the position and attitude of the target object 8 in a real space on the basis of the acquired data. If the shape of the target object 8 is variable such as with an elastic body, this shape is also identified. Then, the information processing corresponding to the identified results is executed so as to generate a display image and audio data that are outputted to the display apparatus 16. The contents of the information processing to be executed in correspondence with a state of the target object 8 are not especially restricted and, therefore, the target object 8 may be various.

For example, the target object 8 may be a game controller that the user holds and moves so as to execute manipulations on a game. In this case, an image indicative of a game world may vary in response to the movement of the controller and the controller can display an image replaced by a virtual object on a captured image with the user captured. Alternatively, in a vision field corresponding to the line-of-sight of the user wearing a head-mounted display, an image indicative of a virtual object interacting with a real object such as a hand of the user can be depicted on this head-mounted display.

The information processing to be executed by use of the states of the target object 8 can be considered in various aspects, so that, in what follows, the processing operations from the image capturing by the image capturing apparatus 12 to the acquisition of the data related with the position, attitude, and shapes of the target object 8 by the information processing apparatus 10 will mainly be described with attention placed on techniques for efficiently and correctly realizing these processing operations. In what follows, the position, attitude, and shape of a target objects are generically referred to as "the states of target object"; however, this means that not all of these states are identified but at least one of these states may only be identified as required. For this purpose, the image capturing apparatus 12 according to the present embodiment at least captures a polarized image in a space to be captured and, at the same time, generates the data of two or more types on the basis of capture results, sending the generated data to the information processing apparatus 10.

The information processing apparatus 10 identifies a state of the target object 8 by use of the sent data and then executes the information processing that is the final purpose. It should be noted that the image capturing apparatus 12 may have a mechanism for capturing an image of natural light (non-polarized light) in addition to a mechanism for capturing a polarized image.

Further, a stereo camera for capturing images of natural light or images of polarized light from the left and right viewpoints having a known interval may be arranged so as to identify the position of a target object in the three-dimensional space by use of principles of triangulation. Such a configuration of the image capturing apparatus 12 may be appropriately determined in accordance with the contents of the intended information processing and the contents of an image to be displayed; in what follows, however, especially the capturing of polarized images and the processing thereof will be described.

Figure 2:
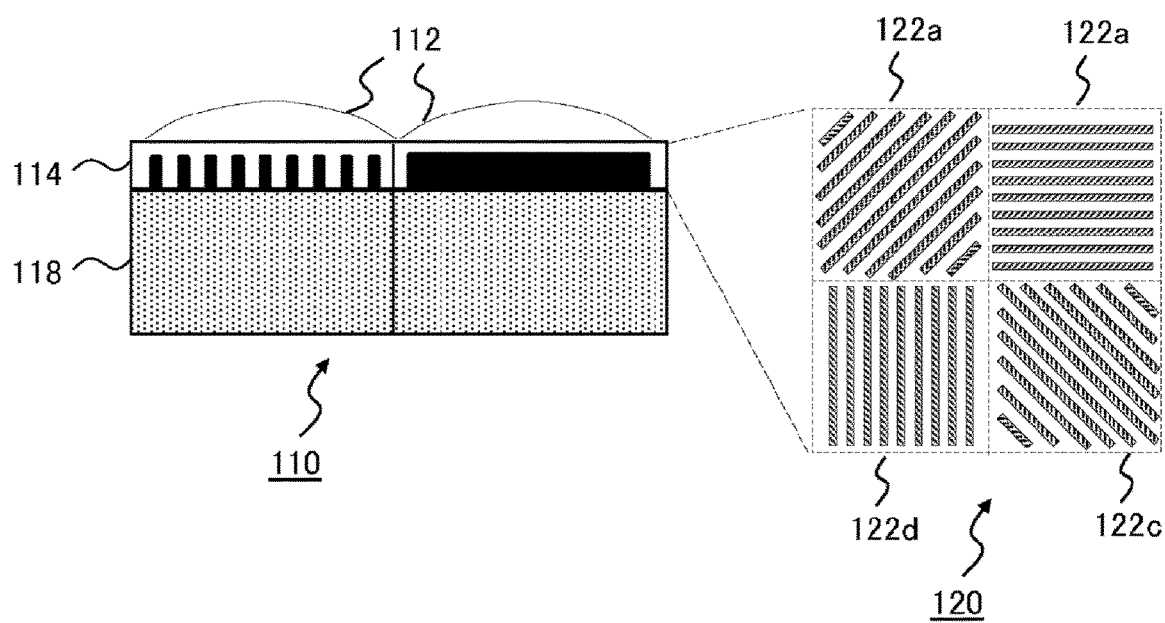
FIG. 2 is a diagram illustrating a configurational example of an image capturing device installed on an image capturing apparatus according to the present embodiment.

FIG. 2 is an exemplary configuration of an image capturing device installed on the image capturing apparatus 12. It should be noted that this diagram schematically illustrating a functional structure of the cross section of the device, omitting details structures of the interlayer insulation film and the wiring of the device. An image capturing device 110 has a microlens layer 112, a wire-grid-type polarizer layer 114, and a photo detection layer 118. The wire-grid-type polarizer layer 114 has polarizers with two or more linear conduction members arrayed in stripes with intervals smaller than the wavelength of incident light. When a light condensed through the microlens layer 112 is put into the wire-grid-type polarizer layer 114, the polarized component in the direction parallel to the line of conductors is reflected, thereby transmitting only the vertical polarized component.

Detection of the transmitted polarized component by the photo detection layer 118 allows the acquisition of a polarized image. The photo detection layer 118 has a semiconductor device structure such as a general charge coupled device (CCD) image sensor or a complementary metal oxide semiconductor (CMOS) image sensor. The wire-grid-type polarizer layer 114 has an array of polarizers with the main-axis angle different from each other in unit of charge reading in the photo detection layer 118, namely, on a pixel basis, or in unit greater than pixel. The right side of the diagram illustrates a polarizer array 120 seen when the wire-grid-type polarizer layer 114 is viewed from top.

In this diagram, the hatched lines are indicative of conductors (or wires) making up a polarizer. It should be noted that the dotted-line rectangles each indicative of a region of a polarizer of the main-axis angle and the dotted lines themselves are not actually formed. In the illustrated example, the polarizers of four main-axis angles are arranged in 2-line, 2-column regions 122a, 122b, 122c, and 122d. In the diagram, the polarizers on the diagonal line are orthogonal in the main-axis angle each other and the adjacent polarizers have a difference of 45 degrees therebetween. That is, four main-axis angle polarizers of every 45 degrees are arranged.

Each polarizer transmits the polarized component in the direction diagonal to the direction of the wire. Consequently, in the photo detection layer 118 arranged below, the polarization information in the four directions every 45 degrees can be obtained in the regions corresponding to the four regions 122a, 122b, 122c, and 122d. Further arraying such polarizer arrays of four main-axis angles into the vertical and horizontal directions by the predetermined number and connecting a peripheral circuit for controlling charge reading timing allows the realization an image sensor by which the polarization information of four types is simultaneously obtained as two-dimensional data.

An image acquisition technology based on the wire-grid-type polarizer is disclosed in Japanese Patent Laid-Open No. 2012-80065 and so on, for example. However, the device structure of the image capturing apparatus 12 according to the present embodiment is not restricted to the illustrated structure. For example, between the wire-grid-type polarizer layer 114 and the photo detection layer 118, a color filter layer including filter arrays for transmitting red, green, and blue lights may be arranged so as to acquire the polarization information by color in accordance with the main-axis angle of the polarizer and a combination of the colors in the wire-grid-type polarizer layer 114. Further, the polarizer is not restricted to the wire grid type; namely, any practically available types such as linear dichroic polarizer or the like may be used. Alternatively, a structure in which a polarizing plate with the main-axis angle variable is arranged in front of a general camera may be used.

FIG. 3 is a diagram illustrating an internal circuit configuration of the information processing apparatus 10. The information processing apparatus 10 has a central processing unit (CPU) 23, a graphics processing unit (GPU) 24, and a main memory 26. Each of these parts is connected with each other via a bus 30. The bus 30 is further connected to an input/output interface 28. The input/output interface is connected to a communication block 32 made up of peripheral device interfaces such as universal serial bus (USB) and Institute of Electrical and Electronics Engineers (IEEE) 1394 or a wired or wireless LAN network interface, a storage block 34 made up of a hard disc drive or a nonvolatile memory, an output block 36 for outputting data to the display apparatus 16, an input block 38 through which data is inputted from the image capturing apparatus 12 or an input apparatus not depicted, and a recording media driving block 40 for driving removable recording media such as a magnetic disc, a magneto-optical disc, or a semiconductor memory.

The CPU 23 controls the entirety of the information processing apparatus 10 by executing an operating system stored in the storage block 34. In addition, the CPU 23 executes various programs loaded from the removable recording media into the main memory 26 or downloaded via the communication block 32. The GPU 24 has a function of a geometry engine and a function of a rendering processor and executes drawing processing by following drawing commands from the CPU 23, storing the data of a resultant display image into a frame buffer not depicted. Then, the GPU 24 converts the display image stored in the frame buffer into a video signal and outputs the video signal to the output block 36. The main memory 26 is made up of a random access memory (RAM) and stores programs and data that are necessary for the execution of processing.

Figure 4:
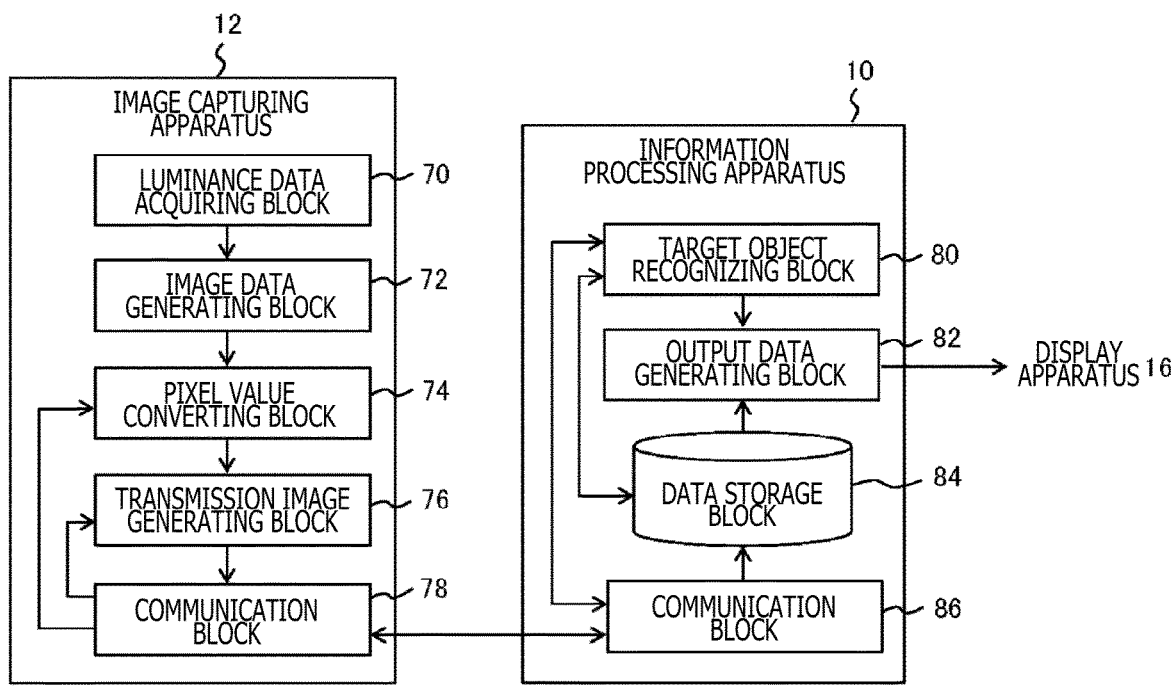
FIG. 4 is a diagram illustrating functional blocks of the image capturing apparatus and the information processing apparatus according to the present embodiment.

FIG. 4 is a diagram illustrating the functional block configurations of the image capturing apparatus 12 and the information processing apparatus 10. Each of the functional blocks illustrated in this diagram can be realized by any one of the configurations of a CPU, a GPU, a microprocessor, a computational circuit, an image capturing device, and memories of various types in hardware; in software, each functional block can be realized by programs loaded from a recording medium into a memory so as to provide various functions such as computational function, drawing function, and communication function. Therefore, it is understood by those skilled in the art that these functions can be realized in a variety forms by hardware alone, software alone or combinations thereof and therefore are not restricted thereto.

The image capturing apparatus 12 has a luminance data acquiring block 70 for acquiring luminance data by image capturing, an image data generating block 72 for generating data of a captured image having a predetermined resolution from the luminance data, a pixel value converting block 74 for converting a pixel value of a captured image into a predetermined parameter, a transmission image generating block 76 for connecting data of two or more types into a transmission format, and a communication block 78 for receiving a request from the information processing apparatus 10 so as to send this data.

The luminance data acquiring block 70 acquires the luminance distribution of the polarized components in two or more directions by the two-dimensional array of the image capturing device 110 illustrated in FIG. 2, for example. This luminance distribution is a so-called RAW image of a polarized captured image. The image data generating block 72 executes mosaic processing for interpolating polarized luminance values discretely obtained in each direction and, at the same time, generates a polarized image having a predetermined resolution by the reduction in two or more steps.

The pixel value converting block 74 executes predetermined computation for each pixel by use of a polarized image and generates a new image with the result of the computation used as a pixel value. To be more specific, the pixel values of the polarized images in two or more directions are summarized for each pixel at the same position so as to compute, for each pixel, an intermediate parameter necessary for acquiring the normal line of a target object or a parameter indicative of the normal line. The data to be newly generated data as described above may be different from a general "image" that is visually meaningful for some parameters, but can be handled in the same manner as a captured image as a two-dimensional map related with a pixel, so that this newly generated data may be hereafter referred to "image." Specific parameter examples will be described later. It should be noted that the pixel value converting block 74 also has a route through which the pixel values of a polarized image generated by the image data generating block 72 are outputted without change.

The transmission image generating block 76 integrates the data of two or more types inputted from the pixel value converting block 74 and then outputs the data requested from the information processing apparatus 10. In the present embodiment, the generation of data of various types to be internally executed by the image capturing apparatus 12 is local processing on a pixel basis or in unit of two or more neighbor pixels. Therefore, by streaming each processing operation, the data of two or more types are inputted in the transmission image generating block 76 in a sequence of pixels. The transmission image generating block 76 first connect these pieces of data with each other into one data stream and then reconnects only the extracted requested pieces of data so as to form a data stream as a final transmission form.

At this moment, by cyclically connecting the data of various types with each other in unit of pixel line of a size considering the generation period of each type of data, the processing from image capturing to data transmission can be executed at a high speed and, at the same time, the extraction of requested data and the distinction between the data in the information processing apparatus 10 are facilitated. The communication block 78 establishes communication with the information processing apparatus 10, accepts a request related with the type of necessary data and the region on an image, and notifies the pixel value converting block 74 and the transmission image generating block 76 thereof.

Then, the data stream generated by the transmission image generating block 76 is sequentially packetized and the resultant packets are sent to the information processing apparatus 10. The communication block 78 sends the packets to the information processing apparatus 10 in accordance with a predetermined communication protocol such as USB 1.0/2.0/3.0 or the like. The communication with the information processing apparatus 10 may be executed not only in a wired manner but also in a wireless manner such as wireless LAN communication like IEEE 802.11a/b/g or infrared ray communication like infrared data association (IrDA).

The information processing apparatus 10 requests the image capturing apparatus 12 for data and accordingly has a communication block 86, a data storage block 84 for storing the acquired data, a target object recognizing block 80 for identifying the state of a target object by use of the received data, and an output data generating block 82 for generating data to be outputted on the basis of the state of a target object. The communication block 86, realized by the communication block 32, the CPU 23 and so on illustrated in FIG. 3, acquires a data stream indicative of a polarized image and various parameters from the image capturing apparatus 12.

The data storage block 84, realized by the main memory 26, sequentially stores the data acquired by the communication block 86. At this moment, the communication block 86 sorts the data of two or more types included in the data stream so as to reconstruct individual images. Since the rules of connecting the data of various types in a data stream are determined by the contents of each data request to the image capturing apparatus 12, the sorting processing can be executed on this request.

The target object recognizing block 80, realized by the CPU 23 and the GPU 24, identifies the state of a target object by use of the data of various types stored in the data storage block 84. To be more specific, by directly referencing the data of a polarized image and using an intermediate parameter obtained in the image capturing apparatus 12, the target object recognizing block 80 acquires a normal line vector on the surface of the target object, thereby identifying the position and attitude of the target object. At this moment, by adjusting the state of the three-dimensional model of the target object registered in advance in a virtual space such that the state is adapted to the distribution of the acquired normal line vector, for example, the target object recognizing block 80 can correctly identify the position and attitude of the actual target object.

Rather than executing the analysis based on a normal line vector, it is practicable to execute matching between the image of the target object in a polarized image and a template image so as to estimate the position and attitude of the target image from the apparent size and shape. It is also practicable to execute such practical target object recognition processing as face detection, face recognition, hand recognition, or visual tracking on a separately acquired natural-light image. If a stereo camera is installed on the image capturing apparatus 12, a depth image may be generated by use of a stereo image captured from left and right viewpoints, thereby obtaining a position in the real space of the target object.

The depth image is an image in which a distance from the image-captured surface of a subject is indicated as a pixel value in the captured image and can be generated by the principles of triangulation on the basis of the parallax between the corresponding points in a stereo image. Appropriately combining these processing operations of two or more types allows the precision and efficient identification of the state of a target object. For example, by use of a depth image or face detection results, a region, in an image plane, in which the image of a target object is formed, is identified and a normal line vector may be obtained only for this region, thereby obtained the state of the target object in detail. Alternatively, by integrating the distribution of normal line vectors with a depth image, a more precise depth image may be generated that also is indicative of the irregularities on the surface of target object.

In accordance with the contents of the processing to be executed and the state of a target object identified at that point of time, the target object recognizing block 80 determines the type of data to request from the image capturing apparatus 12, the resolution of the data, and the region of image plane from which to request data. For example, at the initial stage, an entire polarized image having low resolution is requested and, after approximately identifying the region of the image of the target object by use of the entire polarized image, the polarized image of only that region or an intermediate parameter is requested at a high resolution. The communication block 86 is notified of the contents to request from time to time which are issued from the communication block 86 to the image capturing apparatus 12.

The output data generating block 82, realized by the CPU 23, the GPU 24, and the output block 36, executes predetermined information processing on the basis of the state of a target object identified by the target object recognizing block 80 so as to generate such data to be outputted as a display image and audio. As described above, the contents of the information processing to be executed here are not especially restricted. For example, if a virtual object is drawn on a captured image such that the virtual object is in contact with a target object, the output data generating block 82 draws the object on a natural-light captured image read from the data storage block 84 such that the object corresponds to the state of a target object identified by the target object recognizing block 80. The output data generating block 82 sends the output data such as the display image and so on generated as described above to the display apparatus 16.

Figure 5:
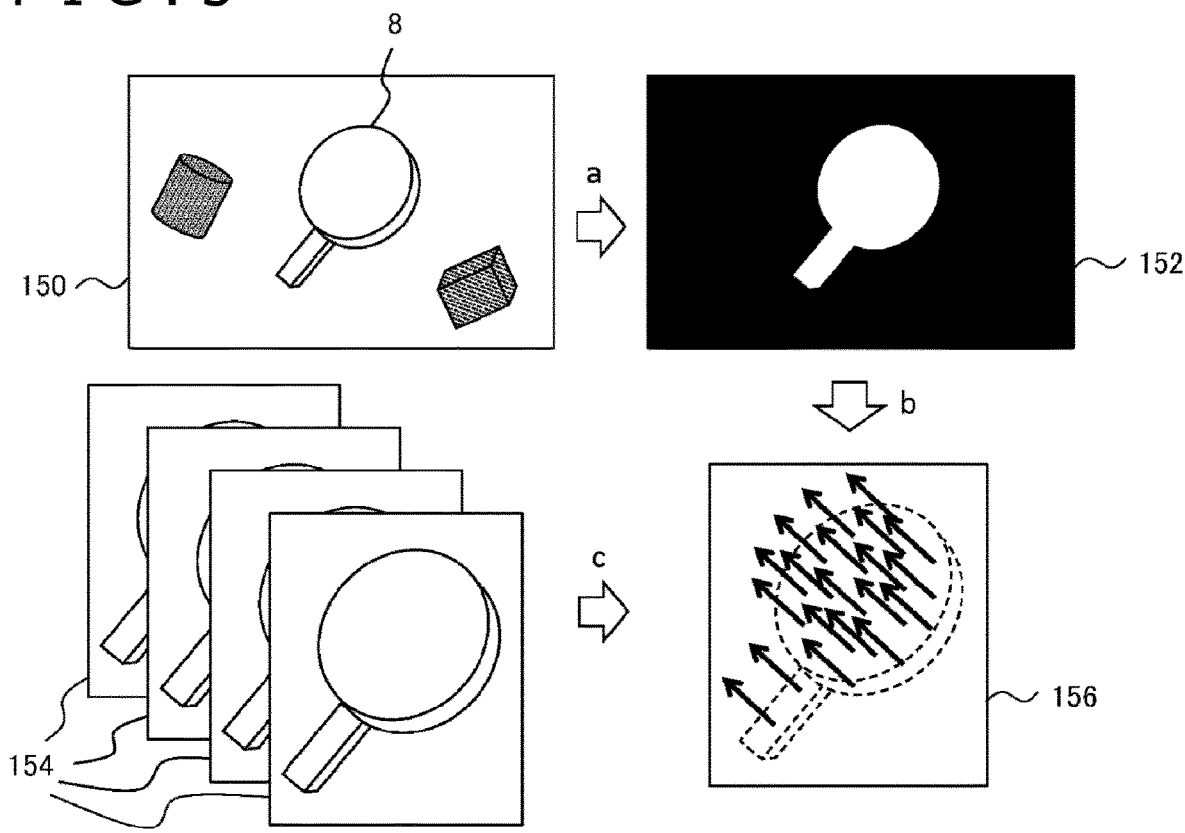
FIG. 5 is a diagram schematically illustrating one example of processing for acquiring states of a target object according to the present embodiment.

FIG. 5 is a diagram schematically illustrating one example of processing for acquiring the state of a target object in the present embodiment. In this example, a subject including the target object 8 is formed on a captured image 150. First, the target object recognizing block 80 extracts a region of an image of the target object 8 by use of an entire image having a low resolution (arrow a). An image 152 is indicative of extraction results, the region of the image of the target object 8 being blank. For the extraction of the region of a target object, the detection processing of various types based on external shape may be used as described above or the positional information of the target object indicated by a depth image may be used. Alternatively, the change in the state of a target object acquired in the image frames so far may be used. Still alternatively, appropriate combinations of the above-mentioned methods may be used.

Next, the target object recognizing block 80 acquires the normal line vector of a target object by analyzing a polarized image 154 having a high resolution in the extracted region and acquiring an intermediate parameter of this region from the image capturing apparatus 12 (arrows b and c). For example, if the target object 8 is a paddle and if the normal line vector distribution thereof is obtained as indicated by arrows in an image 156, then a virtual ball that bounces in a proper direction in accordance with the tilt of arrows can be drawn on a captured image. Consequently, a table tennis game with the target object 8 being a controller can be realized.

As described above, the introduction of an image capturing device having a polarizer having two or more main-axis angles allows the acquisition of polarized images in two or more directions. By acquiring the change in the luminance relative to polarization directions for each pixel use of these polarized images, the normal line vector on the surface of the target object indicated by that pixel can be acquired. Technologies for acquiring various types of information of a subject by use of polarized images have been under research. Methods of obtaining the normal line vector on the surface of a subject is disclosed in Gary Atkinson and Edwin R. Hancock, "Recovery of Surface Orientation from Diffuse Polarization," IEEE Transactions on Image Processing, June 2006, 15(6), pp. 1653-1664 and Japanese Patent Laid-Open No. 2009-58533, for example. In the present embodiment, these methods may be appropriately employed. The following describes an overview thereof.

First, the luminance of the light observed through a polarizer changes as in the following equation relative to main-axis angle $\theta_{pol}$ of the polarizer:

[Math. 1]

$$I = \frac{I_{max} + I_{min}}{2} + \frac{I_{max} - I_{min}}{2}\cos(2(\theta_{pol} - \varphi)) \quad \text{(Equation 1)}$$

In the above equation, $I_{max}$ and $I_{min}$ are a maximum value and a minimum value of the luminance observed and $\varphi$ is polarization phase. As described above, if a polarized image is acquired from four main-axis angles $\theta_{pol}$, luminance I of the pixels at the same position satisfies equation 1 above for each main-axis angle $\theta_{pol}$. Therefore, by approximating a curve passing these coordinates (I, $\theta_{pol}$) to the cosine function by use of least-square $I_{max}$, $I_{min}$, and $\varphi$ can be obtained. By use of $I_{max}$ and $I_{min}$ thus obtained, polarization degree p can be obtained by the following equation.

[Math. 2]

$$\rho = \frac{I_{max} - I_{min}}{I_{max} + I_{min}} \quad \text{(Equation 2)}$$

The normal line on the surface of target object can be represented by azimuth angle $\alpha$ indicative of the angle of the incident surface of light (the emitting surface in the case of diffuse reflection) and zenith angle $\theta$ indicative of an angle on the this surface. Further, according to a dichroic reflation model, the spectrum of reflected light is represented by a linear sum of the spectra of mirror reflection and diffuse reflection. Mirror reflection is the light that is positively reflected on the surface of a body and diffuse reflection is the light diffused by the coloring matter particles making up a body. Azimuth angle $\alpha$ mentioned above is the main-axis angle giving minimum luminance $I_{min}$ in equation 1 in the case of mirror reflection and the main-axis angle giving maximum luminance $I_{max}$ in equation 1 in the case of diffuse reflection.

Zenith angle $\theta$ has relations with polarization degree $\rho_s$ in the case of mirror reflection and polarization degree $\rho_d$ in the case of diffuse reflection as follows.

[Math. 3]

$$\rho_s = \frac{2\sin^2\theta\cos\theta\sqrt{n^2 - \sin^2\theta}}{n^2 - \sin^2\theta - n^2\sin^2\theta + 2\sin^4\theta}$$

$$\rho_d = \frac{(n - 1/n)^2\sin^2\theta}{2 + 2n^2 - (n + 1/n)^2\sin^2\theta + 4\cos\theta\sqrt{n^2 - \sin^2\theta}}$$

(Equation 3)

In the above, n denotes the refractive index of a target object. Zenith angle $\theta$ is obtained by substituting polarization degree $\rho$ obtained in equation 2 into any one of p and p in equation 3. By azimuth angle $\alpha$ and zenith angle $\theta$ thus obtained, normal line vector ($p_x$, $p_y$, $p_z$) is obtained as follows.

[Math. 4]

$$\begin{pmatrix} p_x \\ p_y \\ p_z \end{pmatrix} = \begin{pmatrix} \cos\alpha\cos\theta \\ \sin\alpha\cos\theta \\ \sin\theta \end{pmatrix} \quad \text{(Equation 4)}$$

Thus, from the relation between luminance I indicated by each pixel of a polarized image and main-axis angle $\theta_{pol}$ of a polarizer, the normal line vector of a target object captured in this pixel can be obtained, thereby providing a normal line vector distribution for an entire image. It should be noted however that, since the observed light includes the mirror reflection component and the diffuse reflection component that are different from each other in behavior, the normal line vector also varies depending on the ratio between these components, to be strict. On the other hand, if one target object is focused, it is difficult to think that the ratio between the components irregularly varies on the continuous surfaces of the target object in consideration that the material and color thereof are restricted.

That is, if the normal vector distribution is regarded as the distribution inside the region of the image of one target object, the spatial and temporal variations in the normal line vector may be considered as the reflection of the variation of the actual target object. Therefore, in the present embodiment, one of a mirror reflection model and a diffuse reflection model is employed and the normal line vector obtained for each pixel is evaluated for the entire image of the focused target object, thereby efficiently identifying the state. It should be noted that, in a mode where the target object can be restricted such as a controller of a game, the color and material of the target object can be registered in advance so as to employ a more proper model, thereby enhancing the state identification accuracy.

Figure 6:
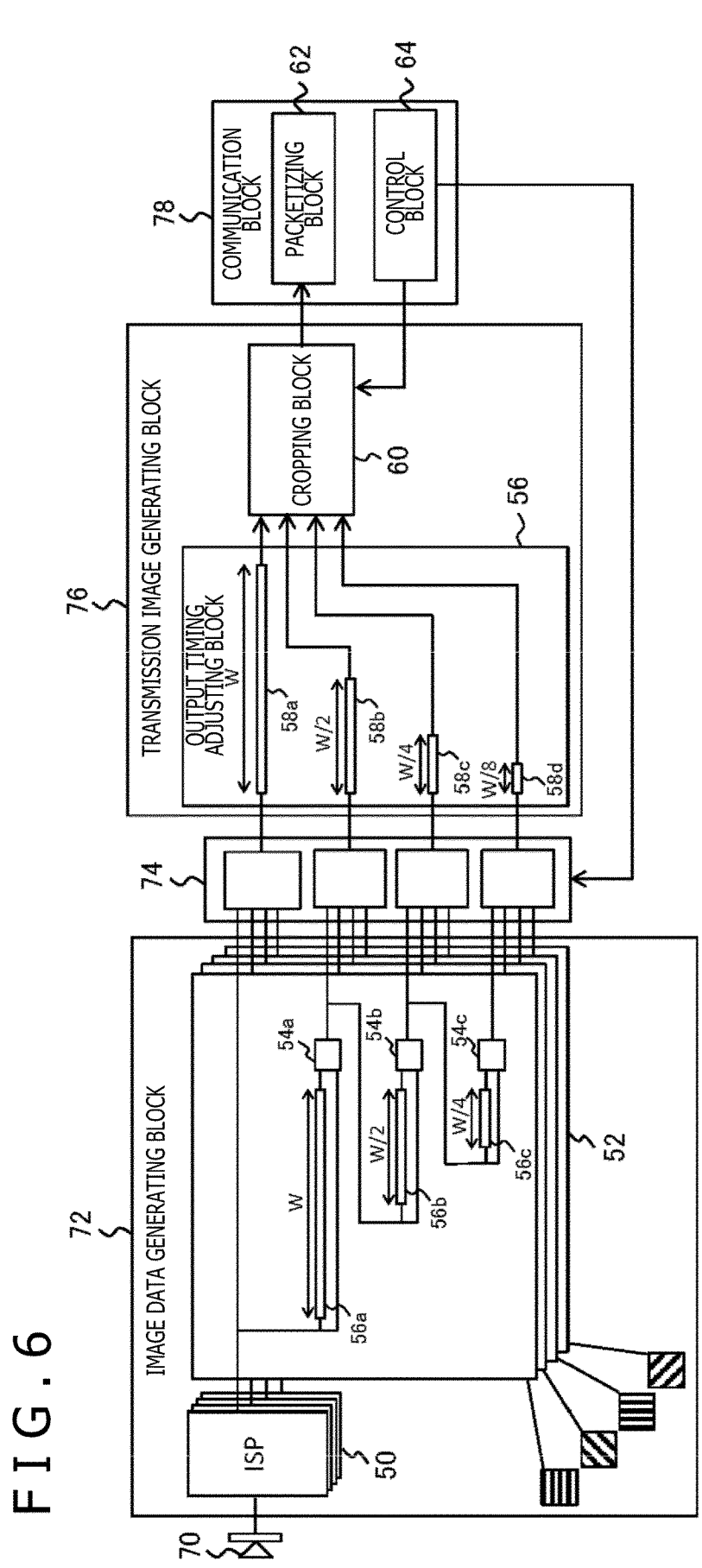
FIG. 6 is a diagram illustrating the configuration of the image capturing apparatus according to the present embodiment in more detail.

FIG. 6 is a diagram illustrating the configuration of the image capturing apparatus 12 in more detail. The luminance data acquiring block 70 acquires the luminance distribution of the polarized components in two or more directions by the two-dimensional array of image capturing device illustrated in FIG. 2, for example. According to the image capturing device illustrated in FIG. 2, the luminance of the polarized components in four directions can be discretely acquired at the position depending on the arrangement of the polarizer of each main-axis angle.

The image data generating block 72 has an image signal processor (ISP) 50 and a pyramid filter block 52. The ISP 50 generates four polarized images by interpolating the polarization illumination data in each direction. An algorithm for use in the interpolation may be a general-purpose algorithm. Executing the interpolation processing in parallel in four directions allows the simultaneous output of the pixel lines of four polarized images. It should be noted that the ISP 50 also executes correction processing of various types to be executed in a general image capturing apparatus, in addition to the interpolation processing.

The four polarized images generated by the ISP 50 are sequentially sent to the pixel value converting block 74 and, at the same time, stepwise reduced in the pyramid filter block 52. In what follows, the polarized images generated by the ISP 50 or the images of various data having the same size (resolution) as that of this image will be referred to as "1/1 images" and the polarized images reduced to 1/N or the images of various data having the same size as that of this image will be referred to as "1/N images." The pyramid filter block 52 has the number of ¼ reduction filters in accordance with a necessary resolution level and stepwise reduces the polarized images in each direction, thereby generating polarized images having two or more resolutions. In this diagram, the filters of three layers, a first filter 54a, a second filter 54b, and a third filter 54c, are illustrated, the number of filters being not restricted thereto however.

Each filter executes the processing of computing an average pixel value of four pixels by bi-linearly interpolating the four pixels adjacent to each other. Therefore, the image size after the processing becomes ¼ of that of the image before the processing. In the stage preceding the first filter 54a, a first in first out (FIFO) buffer 56a for holding the pixel values for W that is the number of pixel values in one line of the 1/1 image generated by the ISP 50. The FIFO buffer 56a holds the luminance data of the pixels for one line until the luminance data of the pixels for a next one line are outputted from the ISP 50.

A pixel holding time is determined by the speed of the line scan of an image capturing device. When the luminance data for two lines are inputted, the first filter 54a averages the luminance values for the four pixels of two lines×two columns. Repeating this processing reduces the length of the 1/1 image to ½ in each of line and column, being converted into the size of ¼ as a whole. The converted ¼ image is sent to the pixel value converting block 74 and, at the same time, supplied also to the second filter 54b of the next stage.

In the preceding stage of the second filter 54b, a FIFO buffer 56b is arranged for holding the pixel values for W/2 that is the number of pixels in one line of the ¼ images. The FIFO buffer 56b holds the luminance data of the pixels for one line until the luminance data of the pixels for a next line are outputted from the first filter 54a. When the luminance data of the pixels for two lines are inputted, the second filter 54b averages the luminance values for the four pixels of two lines×two columns. Repeating this processing reduces the length of the ¼ image to ½ in each of line and column, being converted into the size of 1/16 as a whole. The converted 1/16 image is sent to the pixel value converting block 74 and, at the same time, supplied also to the third filter 54c of the next stage.

The third filter 54c also executes the same processing as described above except that the FIFO buffer 56c is arranged for holding the pixel values for W/4 at the preceding stage. Then, an image of 1/64 size is outputted to the pixel value converting block 74. Thus, from each filter of the pyramid filter block 52, the data of a polarized image reduced by ¼ is inputted into the pixel value converting block 74. It should be noted that such a pyramid filter is realized by a known technology. On the other hand, the pyramid filter block 52 according to the present embodiment executes the reduction processing also in parallel after acquiring the data of the polarized images in four directions from the ISP 50 in parallel.

The pixel value converting block 74 computes, for each pixel, a predetermined parameter necessary until a normal line vector is acquired from the polarized images in four directions so as to generate an image with this parameter being a pixel value. Next, of the original polarized image and the newly generated image, the necessary data is selected and outputted in the order of pixel lines. Here, the data of the original polarized data may be one that is integrated to have the number of channels corresponding to two or more directions as pixel values. The mechanism for executing the above-mentioned processing may be independently arranged for each of two or more resolutions that are generated by the image data generating block 72 allows the setting of the combinations of resolutions and data type without restriction.

The pixel value converting block 74 supplies the data selected for each resolution to the transmission image generating block 76 in parallel. Executing a part of the processing related with normal line vectors by the pixel value converting block 74 allows the mitigation of the load of the processing of target object recognition in the information processing apparatus 10, thereby enhancing the efficiency of the information processing to be subsequently executed. Further, the computation of parameters for each resolution in advance allows the information processing apparatus 10 to instantly switch between the combinations of the types and the resolutions of the data to be sent in accordance with the contents of the intended processing and a state of the target object.

It should be noted that, since the types and resolutions of the data to be actually sent are finally selected by the transmission image generating block 76, the data to be outputted by the pixel value converting block 74 may be fixed in accordance with the contents of the information processing. Alternatively, the switching may be done from time to time in response to a request from the information processing apparatus 10. The transmission image generating block 76 has an output timing adjusting block 56 and a cropping block 60. The output timing adjusting block 56 adjusts the timing such that the data of two or more resolutions supplied from the pixel value converting block 74 in parallel are connected in a proper pixel line unit and a proper sequence and outputs the adjusted data.

For this purpose, the output timing adjusting block 56 is arranged with FIFO buffers 58a, 58b, 58c, and 58d for respectively holding the pixel values for one line of polarized images or images of various parameters having sizes of 1/1, ¼, 1/16, and 1/64. That is, the FIFO buffers 58a, 58b, 58c, and 58d hold the pixel values for W, W/2, W4, and W8, respectively.

Every time the data of pixels for one line of a 1/1 image is outputted, the output timing adjusting block 56 basically outputs the data of a pixel line obtained by dividing the one line of a ¼ image by 2, the data of a pixel line obtained by dividing the one line of a 1/16 image by 4, and the data of a pixel line obtained by dividing the one line of a 1/64 image by 8, in this order. According to the present embodiment, the processing to be executed by the image capturing apparatus 12 is executed in a raster sequence in which, with the upper left of an image being the origin, the processing from the left to the right is repeated downward of the image. Then, as described above, the input/output of data in each block in the image capturing apparatus 12 and the transmission of data to the information processing apparatus 10 are basically executed in a stream form in which the pixel values are connected in such a sequence.

The data to be outputted by the output timing adjusting block 56 is also a stream of a sequence of pixel values in which data having two or more resolutions exist together. Therefore, to be strict, a result of connecting the data of two or more resolutions is not generated as the image of a two-dimensional plane. However, as will be described later, if the number of pixels after one cycle of the connection of the data of two or more resolutions is for one line of the image relative to a stream that is outputted by the output timing adjusting block 56, the subsequent processing becomes the same as the processing to be executed on an image that is generally transferred in a stream.

As a result, the output timing adjusting block 56 substantially generates an image obtained by synthesizing the data of 1/1, ¼, 1/16, and 1/64 images. In what follows, this virtual image is referred to as "synthesized image." The cropping block 60 acquires a stream of synthesized images from the output timing adjusting block 56 so as to extract a part of the data included in this stream, the part being requested from the information processing apparatus 10. Connecting the data of various types in a proper pixel line unit and a proper sequence by the output timing adjusting block 56, each of the connected data can configure a rectangular region in each synthesized image. This arrangement allows the simultaneous specification the type and resolution of the requested data and the region on an image plane by specifying the region of each synthesized image.

In the data stream of synthesized images supplied from the output timing adjusting block 56, the cropping block 60 sequentially crops pixel lines corresponding to the specified region and then connects the cropped pixel lines, thereby reconstructing and outputting a new data stream. The communication block 78 has a packetizing block 62 and a control block 64. On the basis of a request signal from the information processing apparatus 10, the control block 64 instructs the pixel value converting block 74 and the cropping block 60 to select any one of the data of various types. Further, the control block 64 may receive a signal for requesting the start and end of image capturing and a signal for specifying image capturing conditions from the information processing apparatus 10 and notify the luminance data acquiring block 70 and the ISP 50 of this information from time to time.

The packetizing block 62 divides the data stream inputted from the cropping block 60 by a size corresponding to a predetermined protocol so as to packetize the divided stream, thereby writing resultant packets to an internal packet buffer (not depicted). In the case of USB, for example, a stream is packetized for each size of end point. Then, the packets in this packet buffer are sequentially transferred to the information processing apparatus 10.

Figure 7:
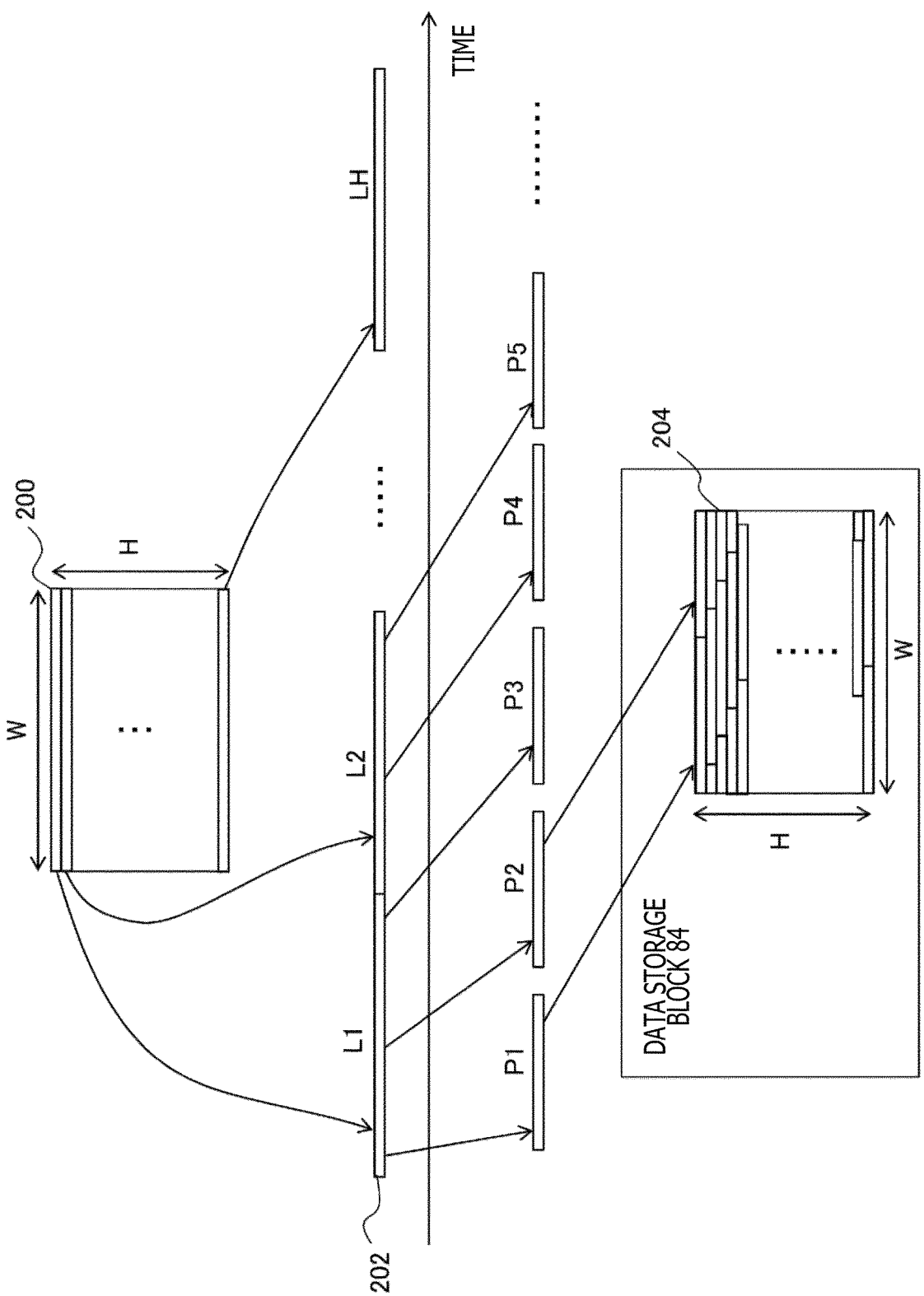
FIG. 7 is a diagram schematically illustrating basic transitions of a data form in the image capturing apparatus and the information processing apparatus according to the present embodiment.

FIG. 7 is a diagram schematically illustrating the basic transitions data forms in the image capturing apparatus 12 and the information processing apparatus 10. The following describes a case in which the data of an entire image 200 having widths for W pixels in a horizontal direction and H pixels in a vertical direction is sent from the image capturing apparatus 12 to the information processing apparatus 10, for example. As described above, in the present embodiment, the generation and the output of data are executed in an image plane raster sequence and the data to be finally sent is also of a form of a stream in which horizontal pixel lines on an image plane are sequentially connected.

In this diagram, the horizontal axis of a stream 202 is indicative of the passing of time and rectangles L1, L2, . . . , and LH are indicative of the data of the pixels in line 1, line 2, . . . , and line H of the image 200, respectively. Let the data size one pixel be d bytes, then the data size of each rectangle is W×d bytes. The packetizing block 62 packetizes the stream 202 by a predetermined size, thereby generating packets P1, P2, P3, P4, P5, . . . . This sends the packet P1, P2, P3, P4, P5, . . . from the image capturing apparatus 12 to the information processing apparatus 10. Receiving the packets P1, P2, P3, P4, P5, . . . , the communication block 86 of the information processing apparatus 10 stores the data thereof into the data storage block 84.

At this moment, the data of each packet is arranged in a raster sequence such that the number of pixels W in the horizontal direction of the original image 200 becomes the horizontal width so as to develop the data at continuous addresses by W×d×H bytes, thereby generating an image 204 in which the image 200 is restored. In this diagram, rectangles making up the image 204 are each indicative of the data of each packet. The target object recognizing block 80 and the output data generating block 82 use the image 204 developed in the data storage block 84 for the purpose of analysis and drawing an object on the image 204.

Figure 8:
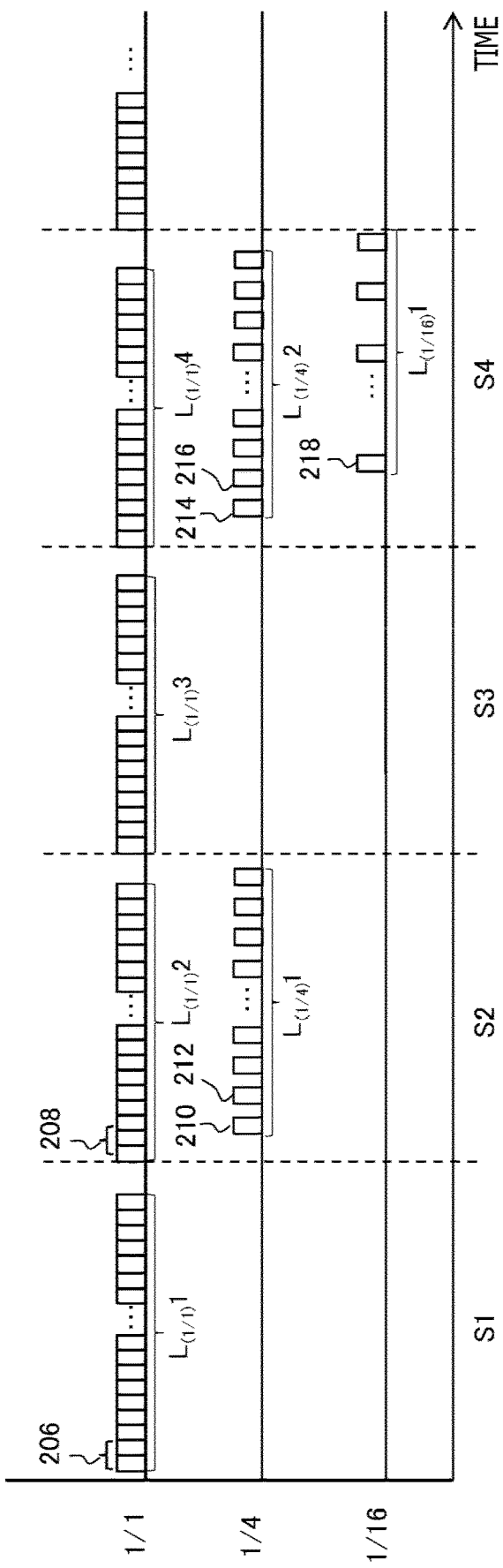
FIG. 8 is a timing chart indicative of a timing with which pixels a pixel value of a polarized image of each resolution is inputted from a pyramid filter block to a pixel value converting block according to the present embodiment.
Figure 9:
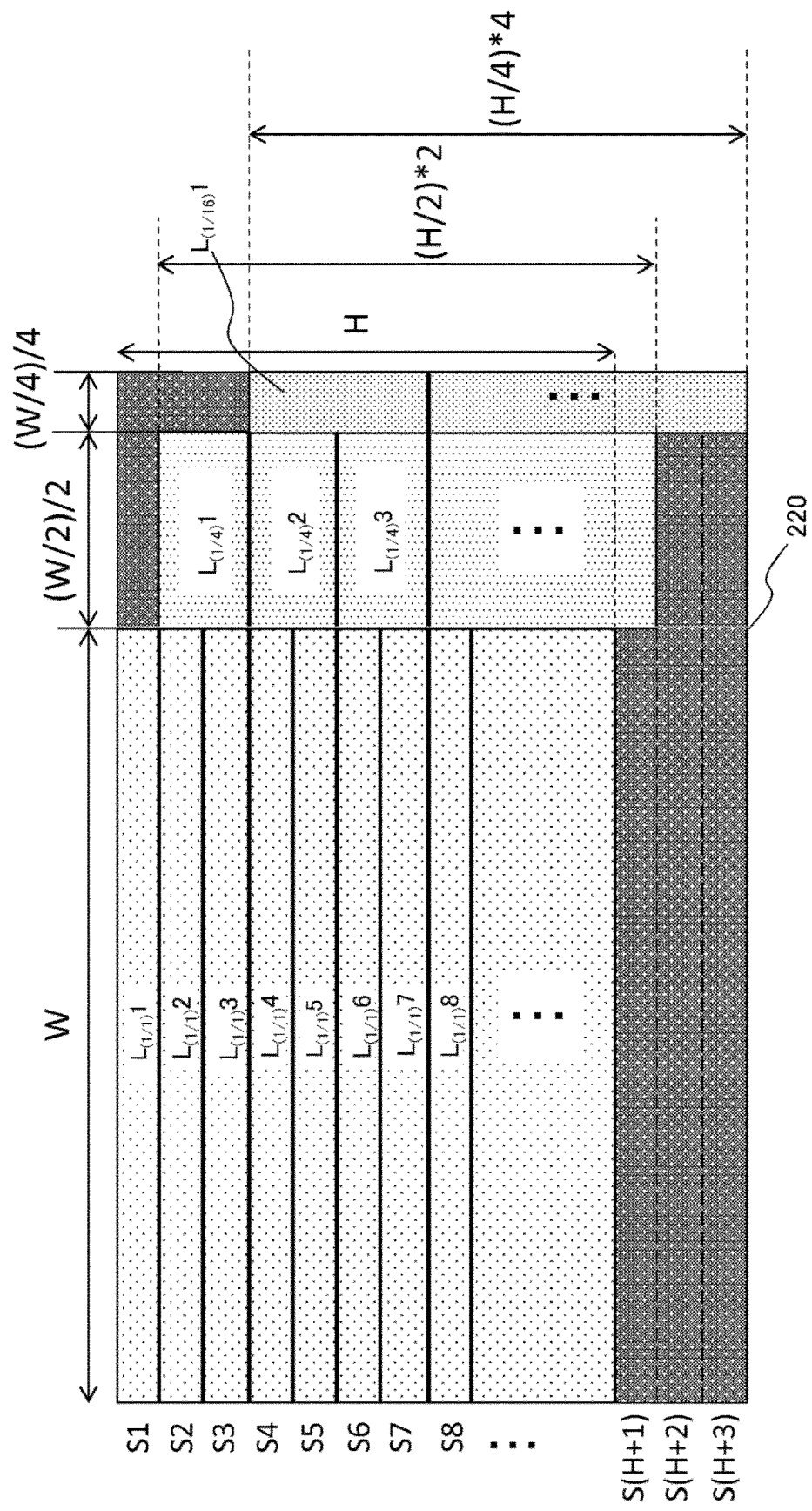
FIG. 9 is a diagram schematically illustrating a synthesized image generated by cyclically outputting data of images having two or more resolutions through an output timing adjusting block according to the present embodiment.

Next, the following describes a technique that the output timing adjusting block 56 connects the data of images having different resolutions. It should be noted that FIGS. 8 and 9 illustrate images having three sizes of 1/1, ¼, and ¹⁄₁₆ (three resolutions), principles remaining the same if images having sizes equal to or less than ¹⁄₆₄. FIG. 8 illustrates a timing chart indicative of timings with which the pixel value of a polarized image having each resolution is inputted from the pyramid filter block 52 to the pixel value converting block 74. In this diagram, time steps S1, S2, S3, S4, . . . are indicative of the periods with which the pixel values of line 1, line 2, line 3, line 4, . . . of a 1/1 image are inputted, respectively.

It should be noted that, since the pixel value converting block 74 computes and outputs predetermined parameters in the sequence of pixels inputted from the pyramid filter block 52 with the illustrated timings, the timings of the data input from the pixel value converting block 74 to the output timing adjusting block 56 are provided in the same manner. First, let a period in which the pixel values for one line of a 1/1 image generated with the highest frequency be a reference time step. Then, this stim step is made correspond to the pixel lines for one horizontal line of a synthesized image. That is, with a period in which the pixel values for one horizontal line of a 1/1 image being a reference period, the data for one horizontal line of a synthesized image is formed.

The upper level, the middle level, and the lower level are indicative of the input timings of a 1/1 image, a ¼ image, and a ¹⁄₁₆ image, one rectangle corresponding to the input for one pixel. First, in time step S1, the pixel values of pixel line $L_{(1/1)}1$ of line 1 of the 1/1 image are sequentially inputted starting from the left pixel. In this time step, since the ¼ image and the ¹⁄₁₆ image are not generated, the pixels of these images are not inputted.

In the next time step S2, the pixel values of pixel line $L_{(1/1)}2$ of line 2 of the 1/1 image are sequentially inputted starting from the left pixel. At this moment, in the pyramid filter block 52, since pixel line $L_{(1/4)}1$ of line 1 of the ¼ image is generated by use of the pixel values of pixel line $L_{(1/1)}1$ of line 1 and pixel line $L_{(1/1)}2$ of line 2 of the 1/1 image, the pixel values of this pixel line are also inputted in time step S2.

For example, the pixel values to be inputted in a period 210 that is the left end of pixel line $L_{(1/4)}1$ of line 1 of the ¼ image are generated by use of the pixel values of two pixels that are inputted in a period 206 among pixel line $L_{(1/1)}1$ of line 1 of the 1/1 image and the pixel values of two pixels that are inputted in a period 208 among pixel line $L_{(1/1)}2$ of line 2. Therefore, in time step S2, the input timing of the pixel values of pixel line $L_{(1/4)}1$ delays behind the input timing of the pixel values of the corresponding pixels of pixel line $L_{(1/1)}2$ by at least two pixels.

In the next time step S3, the pixel values of pixel line $L_{(1/1)}3$ of line 3 of the 1/1 image are inputted. In this time step, the ¼ image and the ¹⁄₁₆ image are not generated, so that these images are not inputted. In the next time step S4, namely, an internal in which the pixel values of pixel line $L_{(1/1)}4$ of line 4 of the 1/1 image are inputted, the pixel values of pixel line $L_{(1/4)}2$ of line 2 of the ¼ image are also inputted as with time step S2.

Further, in the pyramid filter block 52, since pixel line $L_{(1/16)}$ of line 1 of the ¹⁄₁₆ image is generated by use of the pixel values of pixel line $L_{(1/4)}1$ of line 1 and pixel line $L_{(1/4)}2$ of line 2 of the ¼ image, the pixel values of this pixel line are also inputted in time step S4. For example, in pixel line $L_{(1/16)}1$ of line 1 of the ¹⁄₁₆ image, the pixel values to be inputted in a first input period 218 are generated by use of the pixel values of two pixels to be inputted in the period 210 and the period 212 in the pixel line $L_{(1/4)}$ of line 1 of the ¼ image and the pixel values of two pixels to be inputted in the period 214 and the period 216 in pixel line $L_{(1/4)}2$ of line 2.

For this reason, in time step S4, the input timing of pixel line $L_{(1/16)}1$ delays behind the input timing of the pixel values of the corresponding pixels of pixel line $L_{(1/4)}2$ by at least two pixels. Subsequently, likely repeating the pixel value input of each image inputs all pixel values of the 1/1 image, the ¼ image, and the ¹⁄₁₆ image into the pixel value converting block 74 and then eventually into the output timing adjusting block 56. The output timing adjusting block 56 cyclically outputs these pixel values with proper timings so as to form the data stream that makes up one synthesized image.

FIG. 9 is a diagram schematically illustrating a synthesized image generated by cyclically outputting the data of images having two or more resolutions by the output timing adjusting block 56. It should be noted that, for the ease of understanding, this diagram illustrates a manner in which only the data of three types corresponding to the three resolutions illustrated in FIG. 8 are connected; however, if data of two or more types are generated for one resolution, the data having the same resolution are consecutively connected. In this case, the FIFO buffers 58a through 58d depicted in FIG. 6 are arranged for each type of data to be generated.

In this diagram, S1, S2, S3, . . . are indicative of the same time steps as those illustrated in FIG. 8, the pixel values for one line of the 1/1 image being inputted in each period. In this diagram, the pixel line outputted in each time step is indicated by a dotted rectangle different for each image. As described above with reference to FIG. 8, since, in time step S1, only the pixel values of pixel line $L_{(1/1)}1$ of line 1 of the 1/1 image is inputted, the output timing adjusting block 56 outputs these pixel values without change. Let the number of horizontal pixels of the original polarized image be W, then the number of pixels for one line of the 1/1 image is also W as illustrated.

In the next time step S2, the pixel values of pixel line $L_{(1/1)}2$ of line 2 of the 1/1 image and the pixel values of pixel line $L_{(1/4)}1$ of line 1 of the ¼ image are inputted in parallel with the timings illustrated in FIG. 8. Of these pixel values, the output timing adjusting block 56 temporarily stores the pixel values of pixel line $L_{(1/4)}1$ of line 1 of the ¼ image into the FIFO buffer 58b and continuously outputs the pixel values of pixel line $L_{(1/1)}2$ of line 2 of the 1/1 image before.

When the pixel values of pixel line $L_{(1/1)}2$ of line 2 of the 1/1 image have all been outputted, then pixel line $L_{(1/4)}1$ of line 1 of the ¼ image is read from the FIFO buffer 58b and outputted. At this moment, by considering the pixel values to be outputted in the next time step S3, only the pixel values of the first half (the left half in the image plane) of all pixels of pixel line $L_{(1/4)}1$ of line 1 of the image ¼ are outputted, the remaining pixel values being still stored in the FIFO buffer 58b.

In the next time step S3, only the pixel values of pixel line $L_{(1/1)}3$ of line 3 of the 1/1 image are inputted. The output timing adjusting block 56 outputs the pixel values of this pixel line without change and then reads the pixel values of the last half (the right half in the image plane) that have not yet been outputted of pixel line $L_{(1/4)}1$ of line 1 of the ¼ image from the FIFO buffer 58b and outputs these pixel values. It should be noted that, if pixel line $L_{(1/1)}3$ of line 3 of the 1/1 image is inputted in the period in which the pixel values of the first half of the ¼ image is being outputted in time step S2, then the pixel values of this pixel line are stored in the FIFO buffer 58a so as to be adjusted in output timing. This holds the same with subsequent time steps.

In the next time step S4, the pixel values of pixel line $L_{(1/1)}4$ of line 4 of the 1/1 image and the pixel values of pixel line $L_{(1/4)}2$ of line 2 of the ¼ image and pixel line $L_{(1/16)}1$ of line 1 of the ¹⁄₁₆ image are inputted in parallel with the timings illustrated in FIG. 8. Of these pixel values, the output timing adjusting block 56 temporarily stores the pixel values of pixel line $L_{(1/4)}2$ of line 2 of the ¼ image and pixel line $L_{(1/16)}1$ of line 1 of the ¹⁄₁₆ image into the FIFO buffers 58b and 58c, respectively and continuously outputs the pixel values of pixel line $L_{(1/1)}4$ of line 4 of the 1/1 image before.

When the pixel values of pixel line $L_{(1/1)}4$ of line 4 of the 1/1 image have all been outputted, then the first half part of pixel line $L_{(1/4)}2$ of line 2 of the ¼ image is read from the FIFO buffer 58b and outputted. Next, pixel line $L_{(1/16)}1$ of line 1 of the ¹⁄₁₆ image is outputted. At this moment, by considering the pixel values to be outputted in the subsequent three time steps of time steps S5, S6, and S7, pixel line $L_{(1/16)}1$ of line 1 of the ¹⁄₁₆ image is divided by 4 and only the pixel values of the first part are outputted. The remaining pixel values are stored in the FIFO buffer 58c.

In the next time step S5, only the pixel values of pixel line $L_{(1/1)}5$ of line 5 of the 1/1 image are inputted. The output timing adjusting block 56 outputs the pixel values of this pixel line without change and then reads the pixel values of the last half part not yet outputted of pixel line $L_{(1/4)}2$ of line 2 of the ¼ image from the FIFO buffer 58b and output these pixel values. Further, of the data not yet outputted of pixel line $L_{(1/16)}1$ of line 1 of the ¹⁄₁₆ image, the pixel values of the second part of the data obtained by dividing by 4 are outputted.

Likewise, in the next time step 6, the pixel values of pixel line $L_{(1/1)}6$ of line 6 of the 1/1 image, the pixel values of the first half part of pixel line $L_{(1/4)}3$ of line 3 of the ¼ image, and, of the data not yet outputted of pixel line $L_{(1/16)}1$ of line 1 of the ¹⁄₁₆ image, the pixel values of the third part of the data obtained by dividing by 4 are outputted. In the next time step S7, the pixel values of pixel line $L_{(1/1)}7$ of line 7 of the 1/1 image, the pixel values of the last half part of pixel line $L_{(1/4)}3$ of line 3 of the ¼ image, and, of the pixel line $L_{(1/16)}1$ of line 1 of the ¹⁄₁₆ image, the pixel values of the last part of the data obtained by dividing by 4 are outputted.

That is, pixel line $L_{(1/4)}1$ of line 1 of the ¼ image is outputted in halves in two time steps of time step S2 and time step S3. Further, pixel line $L_{(1/16)}1$ of line 1 of the ¹⁄₁₆ image is outputted in quarters in four time steps of time steps S4, S5, S6, and S7. Let the number of horizontal pixels of the 1/1 image be W, then the numbers of pixels for one horizontal line of the ¼ image and the ¹⁄₁₆ image are W/2 and W/4, respectively, so that, as illustrated in this diagram, the data of (W/2)/2 and (W/4)/4 pixels are outputted per time step, respectively.

The output processing described above is repeated down to the line on the lowest level. At this moment, at the point of time when the data of the pixel line on the lowest level of the 1/1 image has been outputted, the data of the last half of the pixel line on the lowest level of the ¼ image and the data of the remaining ¾ on the lowest level of the ¹⁄₁₆ image remain not outputted. Therefore, in the immediately following time step S (H+1), the data of the last half part of the pixel line on the lowest level of the ¼ image and the data of the second part obtained by dividing the pixel line on the lowest level of the ¹⁄₁₆ image by 4 are outputted.

At this moment, invalid data is first outputted as the data for W pixels in which the data of the 1/1 image has been outputted so far, followed by the output of the ¼ image and the ¹⁄₁₆ image. In the subsequent two time steps S (H+2) and S (H+3), invalid data is first outputted as the data for W+(W/2)/2 pixels in which the data of the 1/1 image and the ¼ image have been outputted so far, followed by the output of the data of the third part and the fourth part obtained by dividing the pixel line on the lowest level of the ¹⁄₁₆ image by 4, respectively. It should be noted that, since this diagram illustrates the width of one line of the pixels wider than the actual width for the convenience of description, the ratio of the invalid data indicated by dark hatching is comparatively large; actually, however, the invalid data is equal to or less than 1% of all area a synthesized image 220.

Outputting under these rules results in the output of the data of W+(W/2)/2+(W/4)/4=21W/16 pixels in each time step except for the first three time steps and the last three time steps. Further, since the output of the pixel values for one line requires one time step for a 1/1 image, two time steps for a ¼ image, and four time steps for a ¹⁄₁₆ image, the number of time steps necessary for outputting the image data for one frame is H=(H/2)×2=(H/4)×4, being equal between the images regardless of the sizes thereof. As a result, the total number of time steps required for outputting the data for one frame of the images of three types is H+3.

As described above, while the data outputted by the output timing adjusting block 56 is a series of pixel values, giving the number of pixels corresponding to each time step, namely, 21W/16 as the number of pixels for one horizontal line in advance allows the data to be outputted in each time step to be handled as the data for one line of the image as with a general mage frame.

If the synthesized image 220 made up as described above is grasped by the two-dimensional plane as illustrated in FIG. 9, each line of the pixel lines in the horizontal direction corresponds to a time step defined with an output period of a 1/1 image as reference. Further, fixing a range occupied by the data of each image in a pixel line outputted in each time step makes up a rectangular region with the data of each image settled as illustrated on the two-dimensional plane of the synthesized image 220. Use of the locality thereof allows the extraction of data by type with ease.

The cropping block 60 crops the image data requested by the information processing apparatus 10 from the synthesized image 220. The processing to be executed by the cropping block 60 is the same as general cropping processing in which a specified rectangular region is cropped from an image so as to exclude an excess region. In the present embodiment, the target of processing is not an image plane but a data stream; however, giving the information regarding the number of pixels for one horizontal line of a synthesized image in advance allows the correspondence between the two-dimensional coordinate of an image plane and the one-dimensional coordinate in a stream with ease and, at the same time, allows the identification of pixels to be cropped in the same manner.

Figure 10:
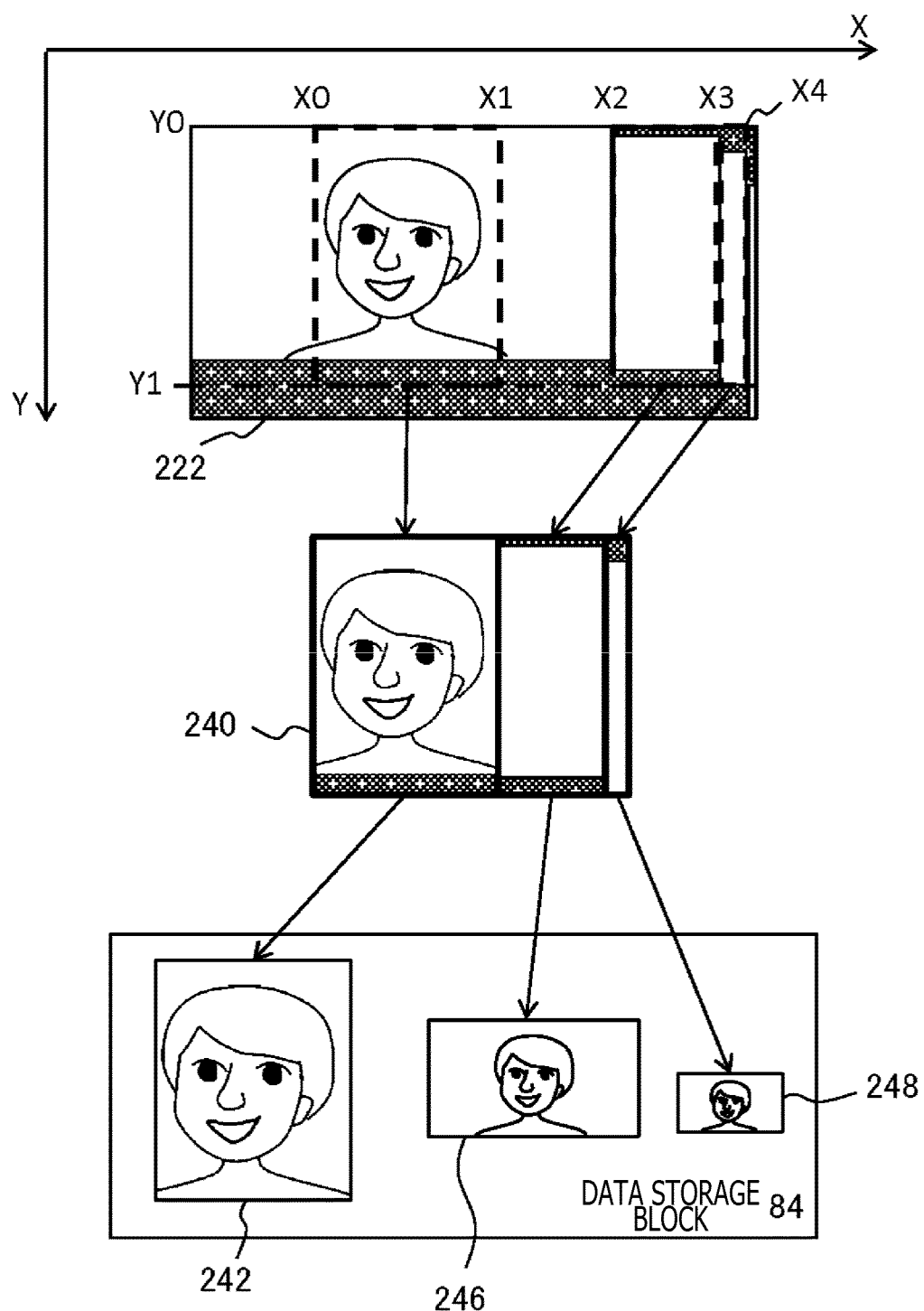
FIG. 10 is a diagram schematically illustrating the change in the state of data answering to a request from the information processing apparatus according to the present embodiment.

FIG. 10 is a diagram schematically illustrating state changes of data responding to a request from the information processing apparatus 10. The top of this diagram is indicative of a synthesized image 222 to be supplied from the output timing adjusting block 56 to the cropping block 60 in a sequence of pixels, corresponding to the synthesized image 220 illustrated in FIG. 9. It should be noted that, according to the connection rules described above, only the data of a 1/1 image keeps the two-dimensional array of pixels also in the synthesized image 222, so that the same image as the original image is displayed. By specifying a region in the synthesized image 222 as described above, the information processing apparatus 10 requests for data.

In the example illustrated in FIG. 10, a region of Y0≤Y<Y1 in the vertical direction (Y-axis direction) and three regions of X0≤X<X1, X2≤X<X3, and X3≤X<X4 in the horizontal direction (X-axis direction) are specified. It should be noted that, in the illustrated example, the region of X0≤X<X1 corresponds to the region around the target object of the 1/1 image and the regions of X2≤X<X3 and X3≤X<X4 correspond to the entire regions of the ¼ image and the ¹⁄₁₆ image, respectively.

The cropping block 60 crops the specified region from the synthesized image 222 from the output timing adjusting block 56 in a sequence of horizontal pixels. To be more specific, only the pixel lines in the ranges of X0≤X<X1, X2≤X<X3, and X3≤X<X4 from the pixel line of Y0 and the cropped pixel lines are sequentially supplied to the packetizing block 62. Next, the pixel line of Y0+1, the pixel line of Y0+2, . . . in the same range are cropped likewise to be supplied to the packetizing block 62. The packetizing block 62 sequentially divides the data stream with the supplied pixel lines connected into predetermined sizes for packetization and sends the resultant packets to the information processing apparatus 10.

As a result, the image capturing apparatus 12 sends the data stream of a new synthesized image 240 consisting of only the data of the cropped region to the information processing apparatus 10. The communication block 86 of the information processing apparatus 10 divides the received data stream by data so as to develop the divided data stream on the continuous addresses in the data storage block 84 such that the image plane is reconstructed. Consequently, in the illustrated example, of the 1/1 image, the data of a region 242 around the target object, an entire region 246 of the ¼ image, and an entire region 248 of the ¹⁄₁₆ image are stored in the data storage block 84.

As described above, the information processing apparatus 10 can simultaneously specify the type, resolution, and the region on an image plane of the data to be requested from the region inside a synthesized image. The cropping block 60 can specify only the minimum necessary data as the target of transmission by cropping only the specified region so as to generate a new stream. Here, as illustrated, making common the vertical ranges of two or more regions to be specified can stabilize bit rates, thereby facilitating the estimation of a time necessary for data transmission.

Figure 11:
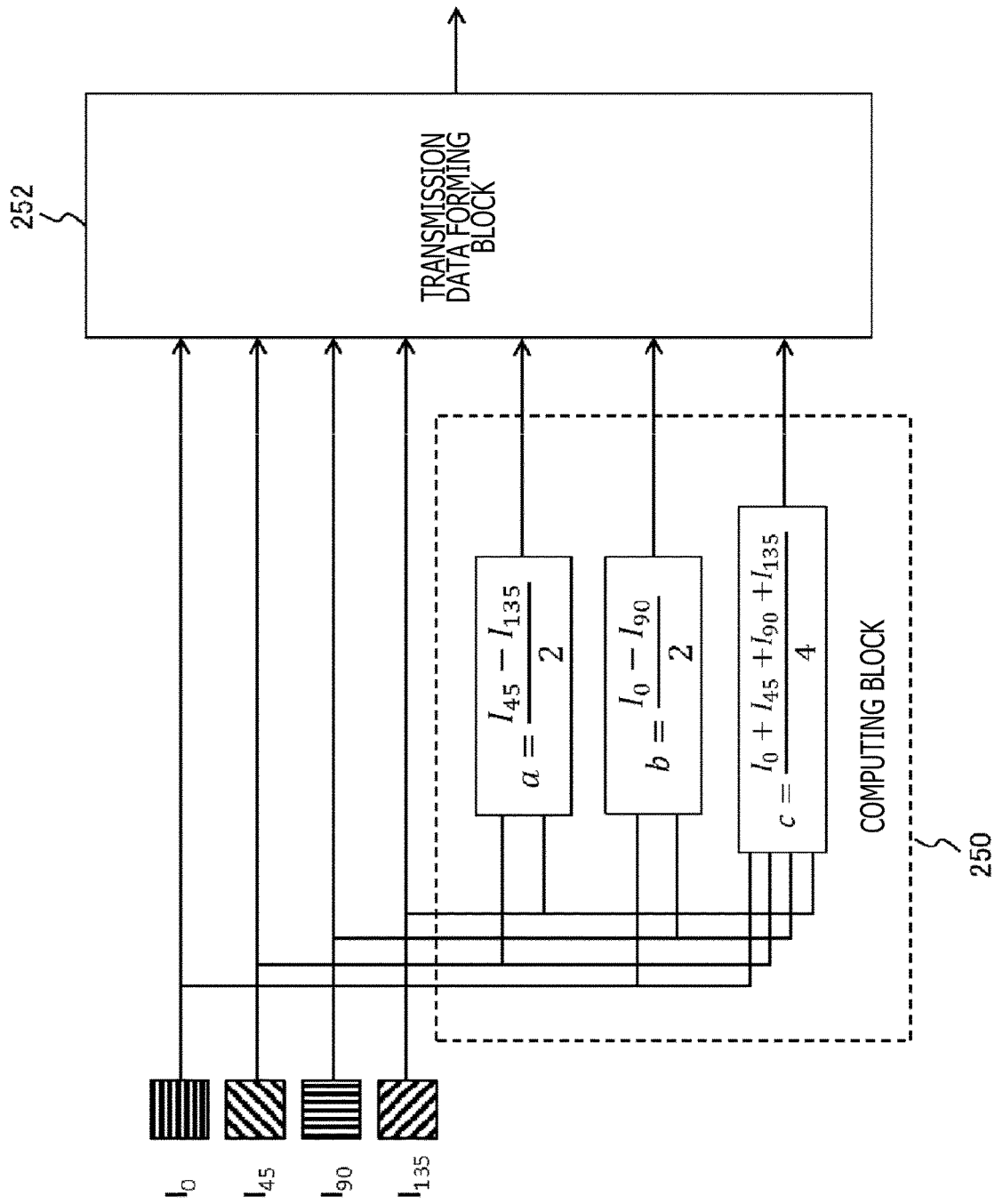
FIG. 11 is a diagram illustrating the configuration of the pixel value converting block according to the present embodiment in more detail.

FIG. 11 is a diagram illustrating the configuration of the pixel value converting block 74 in more detail. The pixel value converting block 74 in this example has a computing block 250 configured to acquire and compute the luminance of the polarized images in four directions so as to generate intermediate parameters and a transmission data forming block 252 configured to select necessary data from the luminance of the original polarized image and the data of the computed intermediate parameters and, at the same time, convert the selected data into a final transmission form. As depicted in FIG. 6, the pixel value converting block 74 has a configuration in which mechanism as illustrated are arranged in parallel for the outputs of the four resolutions of the pyramid filter block 52.

In this diagram, notations "$I_0$," "$I_{45}$," "$I_{90}$," and "$I_{135}$" are indicative of the data of luminance when main-axis angles $\theta_{pol}$ of the polarizers are 0 degree, 45 degrees, 90 degrees, and 135 degrees, respectively. The computing block 250 is made up of the computing elements of three types, each executing the following computations.

[Math. 5]

$$a = \frac{I_{45} - I_{135}}{2}$$

$$b = \frac{I_0 - I_{90}}{2}$$

$$c = \frac{I_0 + I_{45} + I_{90} + I_{135}}{4}$$

(Equation 5)

Here, when main-axis angles $\theta_{pol}$ are 0 degree, 45 degrees, 90 degrees, and 135 degrees, a, b, and c are indicative of intermediate parameters necessary for approximating the function of equation 1 from luminance I thereof, thereby giving coefficients obtained when equation 1 is converted into the following form.

[Math. 6]

$$y = a \sin 2\theta_{pol} + b \cos 2\theta_{pol} + c \quad \text{(Equation 6)}$$

Using the relation between equation 1 and equation 6 polarization degree ρ expressed by equation 3 and polarization phase φ expressed by equation 1 are obtained as follows.

[Math. 7]

$$\rho = \frac{\sqrt{a^2 + b^2}}{c} \quad \text{(Equation 7)}$$
$$\varphi = \arctan\left(\frac{a}{b}\right)$$

The transmission data forming block 252 uses the luminance data of each main-axis angle outputted from the pyramid filter block 52 and the values of parameters a, b, and c that are results of the computation by equation 5 as input values and selects the necessary data from these input values so as to convert the selected data into a predetermined form and output the converted data. For example, if the information processing apparatus 10 requests for the luminance data of a polarized image, the transmission data forming block 252 outputs the values of luminance $I_0$, $I_{45}$, $I_{90}$, and $I_{135}$ for the four main-axis angles as 4-channel pixel values.

If parameters a, b, and c are requested, the values of these parameters are outputted as 3-channel pixel values. Repeating such processing in the sequence of pixels outputted from the pyramid filter block 52 allows the instant input of the requested data into the output timing adjusting block 56. Further, arranging a similar configuration for each resolution to be outputted by the pyramid filter block 52 allows the free combinations of resolution and data types in which the luminance data of a polarized image is to be sent with a certain resolution and parameters a, b, and c are to be sent with another resolution, for example.

Then, as described above, from the synthesized image with the above-mentioned data connected, only the requested region is cropped and the cropped region is sent so as to allow the sending of the minimum necessary data with a low latency. It should be noted that the transmission data forming block 252 may use the inputted data so as to further execute necessary computation and quantization, thereby reducing the data amount as will be described later.

Figure 12:
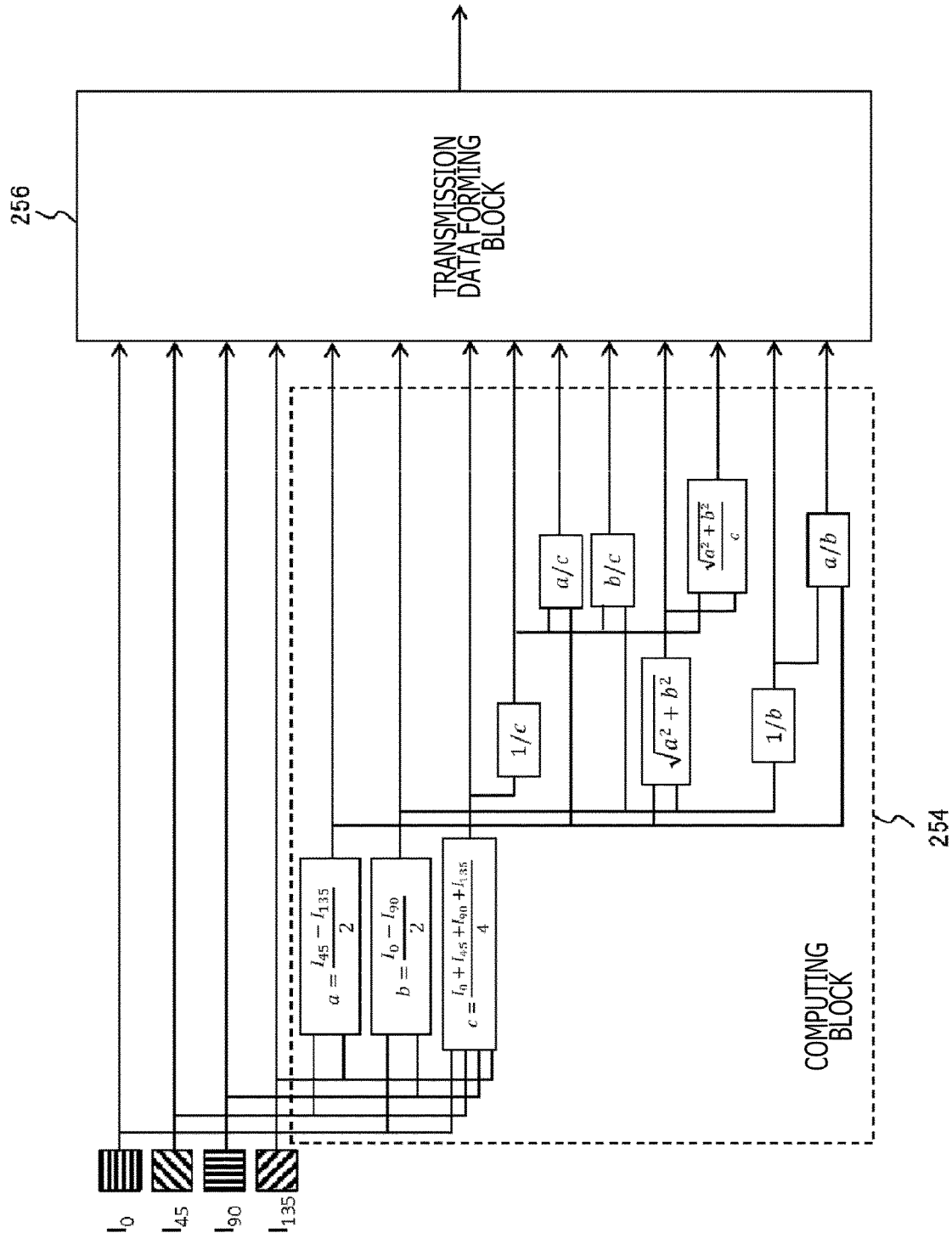
FIG. 12 is a diagram illustrating another example of the configuration of the pixel value converting block according to the present embodiment.

The pixel value converting block 74 executes a part of the processing of acquiring such data for use in the recognition of a target object as the normal line on the surface of subject to be captured and so on in the information processing apparatus 10. Suitably, the arrangement for computing parameters that can be computed on a pixel basis can prevent the flow of the processing in the sequence of pixels in the entire image capturing apparatus 12 from being stopped. In this respect, the types of the parameters to be computed by the pixel value converting block 74 are not restricted. FIG. 12 illustrates another example of the configuration of the pixel value converting block 74. This pixel value converting block 74 is configured to execute computation in further stages than those in the example illustrated in FIG. 11. To be more specific, a computing block 254 computes the parameters a, b, and c indicated in equation 5 and further computes 1/c, a/c, b/c, $(a^2+b^2)^{1/2}$, $(a^2+b^2)^{1/2}/c$, 1/b, and a/b that are obtained in the process of obtaining polarization degree ρ and polarization phase c in equation 7.

Arranging the above-mentioned computing elements on the image capturing apparatus 12 in advance so as to execute an output operation by the same mechanism as that for outputting the luminance of a polarized image allows the supply of the processing contents obtained in the information processing apparatus 10 and the optimum data according to a situation at that time. It should be noted that the connection relation between the computing elements is not restricted to the illustrated relation. Also, it is unnecessary to arrange all of the illustrated computing elements. Further, it is not necessary to input all of the output data from each computing element into a transmission data forming block 256.

Figure 13:
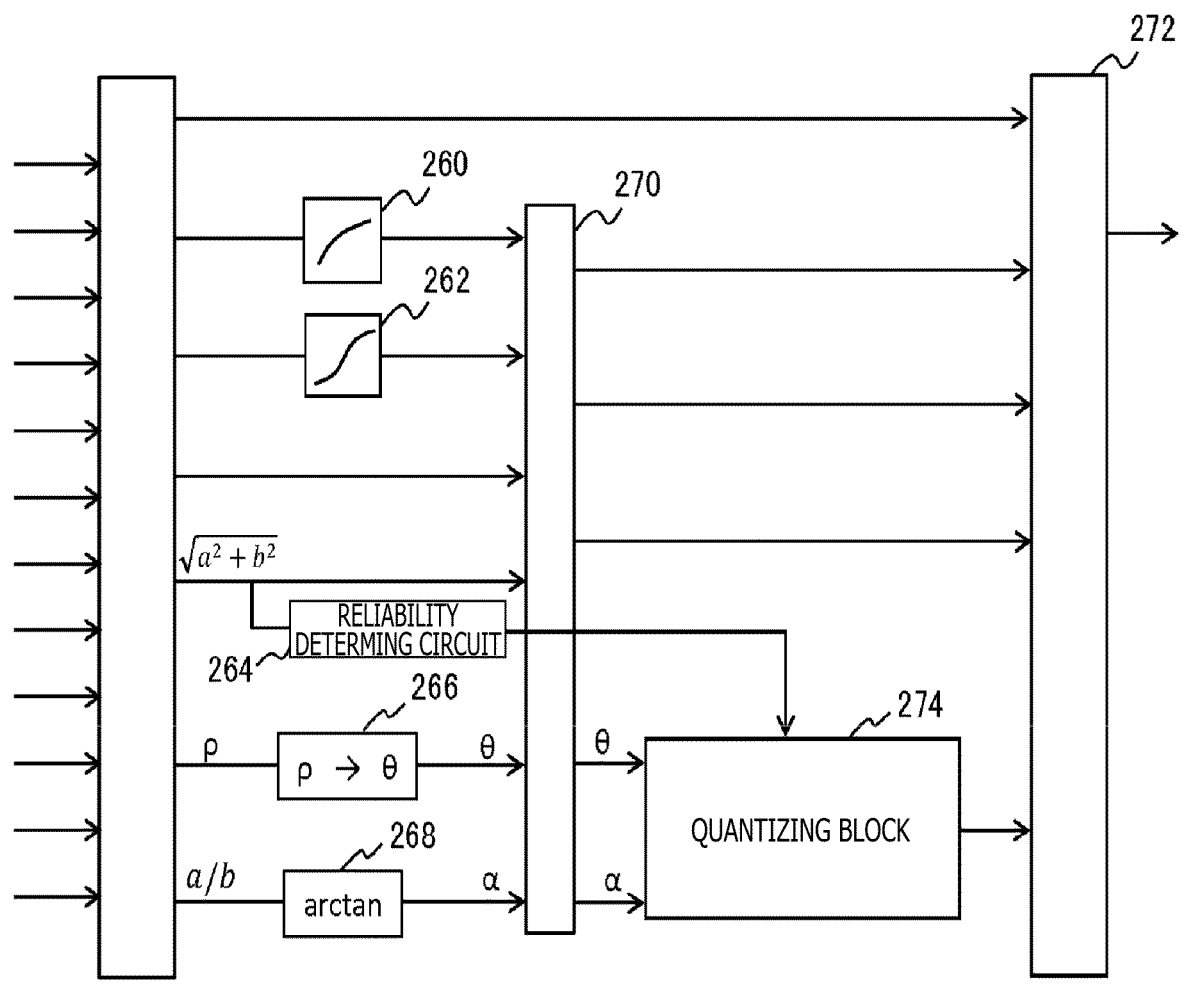
FIG. 13 is a diagram illustrating the configuration of a transmission data forming block in the pixel value converting block illustrated in FIG. 12 in more detail.

FIG. 13 is a diagram illustrating a detail configuration of the transmission data forming block 256 in the pixel value converting block 74 illustrated in FIG. 12. This example has color tone converting circuits 260 and 262 for converting the color tone of a polarized image, a reliability determining circuit 264 for determining the reliability of a normal line, a zenith angle acquiring circuit 266 for acquiring zenith angle θ, and an azimuth angle acquiring circuit 268 for acquiring azimuth angle α. The color tone converting circuits 260 and 262 each substitute luminance values into a logarithmic function and a sigmoid function for conversion, thereby executing color tone conversion such as enhancing the contrast of a polarized image.

The reliability determining circuit 264 generates a value indicative of the reliability a normal line vector acquired from the polarized luminance of a pixel concerned. Generally, as the viewpoint of a camera approaches in the front direction of a subject, namely, as the angle between the normal line of a subject and the optical axis of a camera gets smaller, the azimuth dependency of polarized luminance gets lower, thereby making a computed normal line vector susceptible to the influence of noise. On the basis of a value of $(a^2+b^2)^{1/2}$ outputted from the computing block 254, the reliability determining circuit 264 evaluates the reliability of a normal line separately computed in the image capturing apparatus 12 or the information processing apparatus 10, thereby outputting a value indicative of the reliability.

According to equation 5, the parameters a and b are indicative of the values in proportion to the difference between the degrees of luminance when the main-axis angle has a difference of 90 degrees; therefore, as $(a^2+b^2)^{1/2}$ is smaller, the azimuth dependency of polarized luminance is lower. Therefore, the reliability determining circuit 264 computes the reliability under predetermined rules in which, as $(a^2+b^2)^{1/2}$ increases, the value gets higher. However, the reliability may not be continuous values or may be indicated in two or more steps, or the presence or absence of the reliability may be indicated by binary 1/0 depending on whether or not $(a^2+b^2)^{1/2}$ has exceeded a predetermined threshold value.

In the diagram, the reliability determining circuit 264 outputs the computed value of reliability to a quantizing block 274 to be described later; it is also practicable to separately output the reliability value as a pixel value of an image indicative of the reliability. The zenith angle acquiring circuit 266 acquires a zenith angle θ on the basis of $(a^2+b^2)^{1/2}/c$ that is an approximate value of polarization degree ρ. The relation between polarization degree ρ and zenith angle θ is expressed a mirror reflection model/diffuse reflection model according to equation 3. The zenith angle acquiring circuit 266 holds in an internal memory a conversion table indicative of the relation in equation 3 depending on the model to be employed and acquires and outputs the zenith angle θ with $(a^2+b^2)^{1/2}/c$ acquired from the computing block 254 as an index.

As described above, the pixel value converting block 74 is arranged with the same configuration for each of the four resolutions with which the pyramid filter block 52 generates data; however, the conversion tables for acquiring zenith angle θ may be different from each other depending on the resolutions concerned. This is due to the following reasons. That is, as the data of an image is reduced, namely, the resolution gets lower, the ratio of the true data to a noise component, namely the SN ratio gets higher. This variation in an SN ratio influences the direction of a normal line to be computed. To be more specific, a low SN ratio tends to include an error that zenith angle θ gets greater than a proper value. Suitably, on the basis of this knowledge, a larger correction is given as the resolution gets higher, thereby using a different conversion table so as to provide more correct zenith angle θ. It should be noted that the reliability computation rules in the reliability determining circuit 264 may also be made different depending on resolutions.

The azimuth angle acquiring circuit 268 computes arctangent arctan(a/b) acquired from the computing block 254 to obtain polarization phase ϕ, thereby outputting azimuth angle α according to a model to be employed. A computation result such as above is once stored in a buffer 270 or a buffer 272 and merge and timing adjustment are appropriately executed on the buffered computation result so as to be outputted to the transmission image generating block 76. In this example, however, zenith angle θ and azimuth angle α are inputted in the quantizing block 274 to be quantized, thereby reducing the amount of data. At this moment, the quantizing block 274 further acquires a numeric values indicative of the reliability computed by the reliability determining circuit 264 so as to be sent along with the quantized data.

Figure 14:
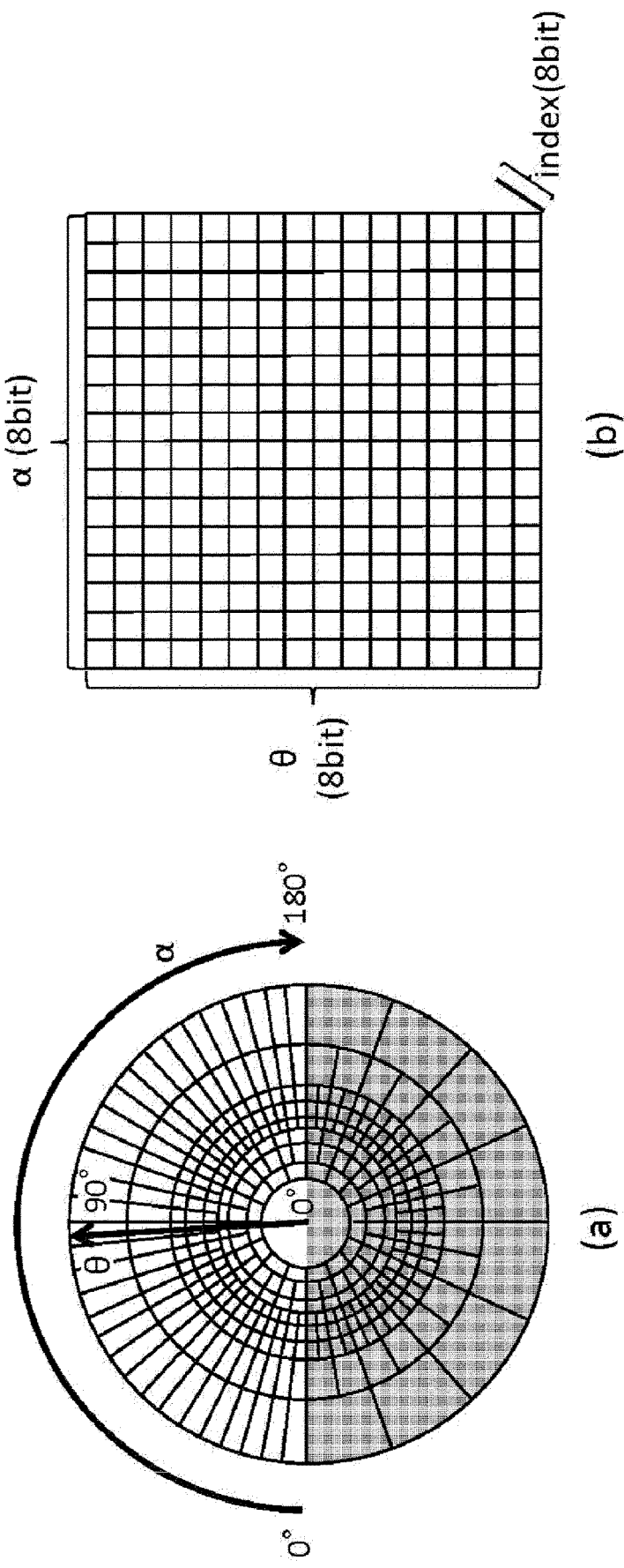
FIG. 14 is a diagram illustrating an example of vector quantization executed by a quantizing block according to the present embodiment.

FIG. 14 is a diagram illustrating an example of vector quantization to be executed by the quantizing block 274. In the diagram, (a) illustrates, in the polar coordinates with zenith angle θ being radius and azimuth angle α being deflection, the quantization unit of vector with these two variables being elements. Generally, the direction of normal line is defined in a range in which phase angle α being 0≤α<360 degrees and zenith angle θ being 0≤θ≤90 degrees. However, as seen from equation 1, since the variation for the azimuth of polarized luminance is in a cycle of 180 degrees, the same behavior results with 0≤α<180 degrees and 180≤α<360 degrees, thereby making it difficult to make distinction between the ranges only from the variation in polarized luminance.

However, especially if a positional variation or a temporal variation in a normal line on the surface of a particular target object is relatively observed, it is hardly possible that phase angle α abruptly changes by 180 degrees. Further, if the surface form of a target object is approximately known, then, even if an error due to such uncertainty occurs in some regions, the orientation of a surface as a whole can be identified. Therefore, in the present embodiment, azimuth angle α is obtained in a range of 0≤α<180 degrees and the region indicated in gray in the polar coordinates in this diagram is excluded. However, if the difference of 180 degrees is distinguished by other means, quantization unit may be set in this region.

In addition, since the reliability of a computed normal line depends on an angle thereof, the granularity of quantization unit is varied by the range of angles so as to enhance compression efficiency and mitigate quantization error at the same time. To be more specific, in the neighborhood in which zenith angle θ is 45 degrees, the reliability of a computed normal line is high, so that quantization unit is made finer. Further, as described above, in the neighborhood in which zenith angle θ is 0 degree, namely, with a normal line with an angle to the optical axis of a camera is small, the reliability is low, so that quantization unit is made coarse. In this diagram, the magnitude of the granularity of such quantization unit is expressed by the difference in area between the partitioned regions in the polar coordinates.

The quantizing block 274 uniquely determines an index from inputted (θ, α) by use of a code book of a kind mentioned above. FIG. 14(b) is indicative of quantization unit with a two-dimensional array of orthogonal axis, each square corresponding to the quantization unit giving the index. In the example illustrated in this diagram, the definition ranges of zenith angle θ and azimuth angle α are each divided by 16, thereby arranging 16×16=256 quantization units. If zenith angle θ and azimuth angle α are each defined as 8-bit data and the index is also defined by 8 bits, the compression ratio resulted from quantization is 50%.

For example, let the index be configured as ($p_x$, $p_y$, $p_z$, reliability), allocating 2 bits for each parameter. Here, ($p_x$, $p_y$, $p_z$) is obtained by converting a representative vector ($θ_r$, $α_r$) for each quantization unit into a vector in an orthogonal coordinate system by equation 4. "Reliability" is a value indicative of the reliability given by the reliability determining circuit 264. It should be noted that, if the reliability is represented by one bit, then some information may further be embedded by use of the remaining one bit.

For example, a tag indicative whether or not the normal line concerned is in the range of angles specified by the information processing apparatus 10 or set in advance may be included. Sending, as a stream, the data of an image with the index having the above-mentioned configuration given for each pixel allows the information processing apparatus 10 to acquire the information regarding the normal line vector as well as the reliability thereof and the information indicative of whether or not the target object is tilted within the range of attention.

Consequently, a state of the target object can be correctly recognized by use of only the normal line vector with the reliability exceeding a threshold value and the degree of considering the state information acquired by other means such as a depth image can be varied by use of the reliability. In addition, only the target object titled within a predetermined range can be processed. In the transmission data forming block 256 illustrated in FIG. 13, a route through which various parameters acquired in the previous stage including the luminance data of a polarized image other than the output data from the quantizing block 274 can be outputted is arranged. The transmission data forming block 256 may only output necessary data among the abovementioned data in accordance with a request from the information processing apparatus 10 or the internal setting.

For example, if only the information regarding a normal line vector having a predetermined resolution is required, the index of 8 bits per pixel outputted by the quantizing block 274 may only be outputted. If the information in more detail is required, the values themselves of zenith angle θ and phase angle α may only be outputted. As described above, since similar computing circuits are arranged in parallel for each resolution in the pixel value converting block 74, only the data required by the information processing apparatus 10 can be instantly outputted in accordance with resolutions or situations on a moment-to-moment basis.

It should be noted that, if only the information regarding a normal line vector is wanted, it is enough to send zenith angle θ, azimuth angle α, and an index with these angles quantized in many cases; however, an arrangement in which intermediate parameters can also be sent allows the security of computational reliability and the use of debugging. Further, targets of quantization by the quantizing block 274 may be any of the parameters to be computed in the previous stage in addition to zenith angle θ and azimuth angle α. For example, a/c and b/c computed by the computing block 254 may be quantized in the same manner as above to be send and $(a^2+b^2)^{1/2}/c$ and a/b may be computed in the information processing apparatus 10 to obtain zenith angle θ and azimuth angle α.

Figure 15:
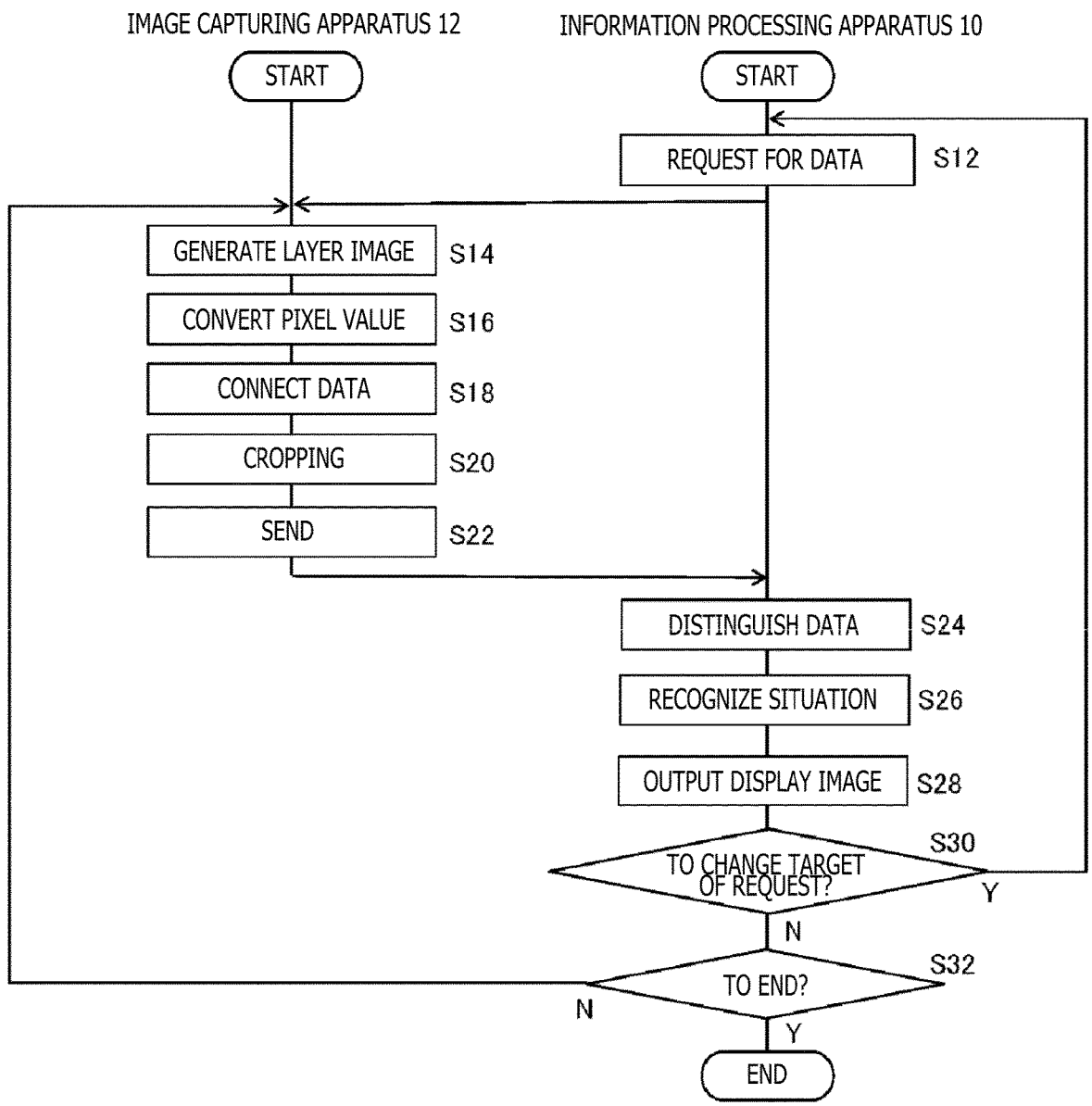
FIG. 15 is a flowchart indicative of a processing procedure for the image capturing apparatus and the information processing apparatus according to the present embodiment to jointly analyze polarized images and output a resultant display image.

Next, the following describes operations of an information processing system that is realized by the configuration described above. FIG. 15 is a diagram illustrating a flowchart indicative of a processing procedure in which the image capturing apparatus 12 and the information processing apparatus 10 according to the present embodiment analyze a polarized image in cooperation and output a resultant display image. The flowchart in FIG. 15 is started when the user instructs the information processing apparatus 10 to start processing with the image capturing apparatus 12 activated. It should be noted that the steps of this flowchart are each indicated by a rectangle connected in series with other steps for the ease of understanding; actually, however, these steps are executed in parallel on a pixel line basis of each frame.

First, the information processing apparatus 10 displays an initial image on the display apparatus 16 and then requests the image capturing apparatus 12 for the transmission of the data necessary in the initial stage, the data being set in an application program or the like (S12). This request is made up of combinations of the type and resolution of the necessary data and a region on an image plane and can be expressed by specifying a region in a virtual synthesized image generated in the transmission image generating block 76. Alternatively, the stage before a synthesized image is generated, namely, a combination of the type and resolution of data may be specified for the pixel value converting block 74.

It should be noted that, if a mechanism for capturing a natural-light image for the image capturing apparatus 12, the information processing apparatus 10 may request for this captured image as an initial image and display this image on the display apparatus 16. Receiving the request from the information processing apparatus 10, the communication block 78 of the image capturing apparatus 12 notifies the pixel value converting block 74 and the transmission image generating block 76 thereof from time to time. On the other hand, the image data generating block 72 of the image capturing apparatus 12 interpolates the luminance data acquired by the luminance data acquiring block 70 and then generates the hierarchical data of the captured image having different resolutions provided by the stepwise reduction (S14).

The above description is mainly about polarized images generated by use of polarizers having four main-axis angles; however, it is also practicable to generate hierarchical data for natural-light captured images in the same manner. If a stereo camera is arranged, hierarchical data may be generated for each of the stereo images captured from the left and right viewpoints. Next, the pixel value converting block 74 of the image capturing apparatus 12 executes predetermined computation and conversion by use of images having polarized components in two or more directions so as to generate, as sorted by resolutions, new images with the computed parameters being pixel values, thereby outputting at least one of the generated images (S16).

Next, the transmission image generating block 76 of the image capturing apparatus 12 generates a virtual synthesized image by cyclically connecting the converted data outputted in a sequence of pixels for each resolution under the rules as described with reference to FIG. 9 (S18), thereby outputting the area requested in S12 by cropping (S20). It should be noted that this synthesized image may include a natural-light captured image and a stereo image. The communication block 78 packetizes, as sorted by a predetermined size, a data stream outputted in a sequence of pixels cropped from the synthesized image and sends the resultant packets to the information processing apparatus 10 (S22).

The communication block 86 of the information processing apparatus 10 stores the transmitted data stream into the data storage block 84 by diving the data stream by data (S24). At this moment, as illustrated in FIG. 10, reconstructing the image plane in accordance with the resolution of each piece of data allows the handling of the data stream as image data in the subsequent processing. The target object recognizing block 80 identifies such states of the target object as position, attitude, and shape by use of this data (S26). AT this moment, the image analysis may be executed by such other means than normal lines as stereo matching, tracking, face detection, gesture detection, and so on.

The output data generating block 82 generates a display image by making a gram progress by use of particular results and executing the processing corresponding to movements and outputs the generated display image to the display apparatus 16 (S28). If it is necessary, as a result of the state recognition of the target object, to change the combinations of types, resolution, and region on image plane of the data to be requested to the image capturing apparatus 12, namely, the necessary data, (Y of S30), then the target object recognizing block 80 requests the image capturing apparatus 12 for the changed data via the communication block 86 (S12). In this case, the pixel value converting block 74 of the image capturing apparatus 12 and the cropping block 60 changes the data to be outputted and the regions to be cropped with a timing of processing a new image frame, thereby executing the processing of S14 through S22.

If there is no need for changing the data to be requested and there is also no need for ending the processing (N of S30 and N of S32), then the image capturing apparatus 12 continues sending the data stream by repeating the processing of S14 through S22 for the following image frames in the same manner as above. In any case, the information processing apparatus 10 repeats the processing of S24 through S28. Consequently, the results of the information processing executed by use of the image captured by the image capturing apparatus 12 are displayed on the display apparatus 16 as a moving image. If the end of processing is specified by the user, for example, all the processing is ended (Y of S32).

Figure 16:
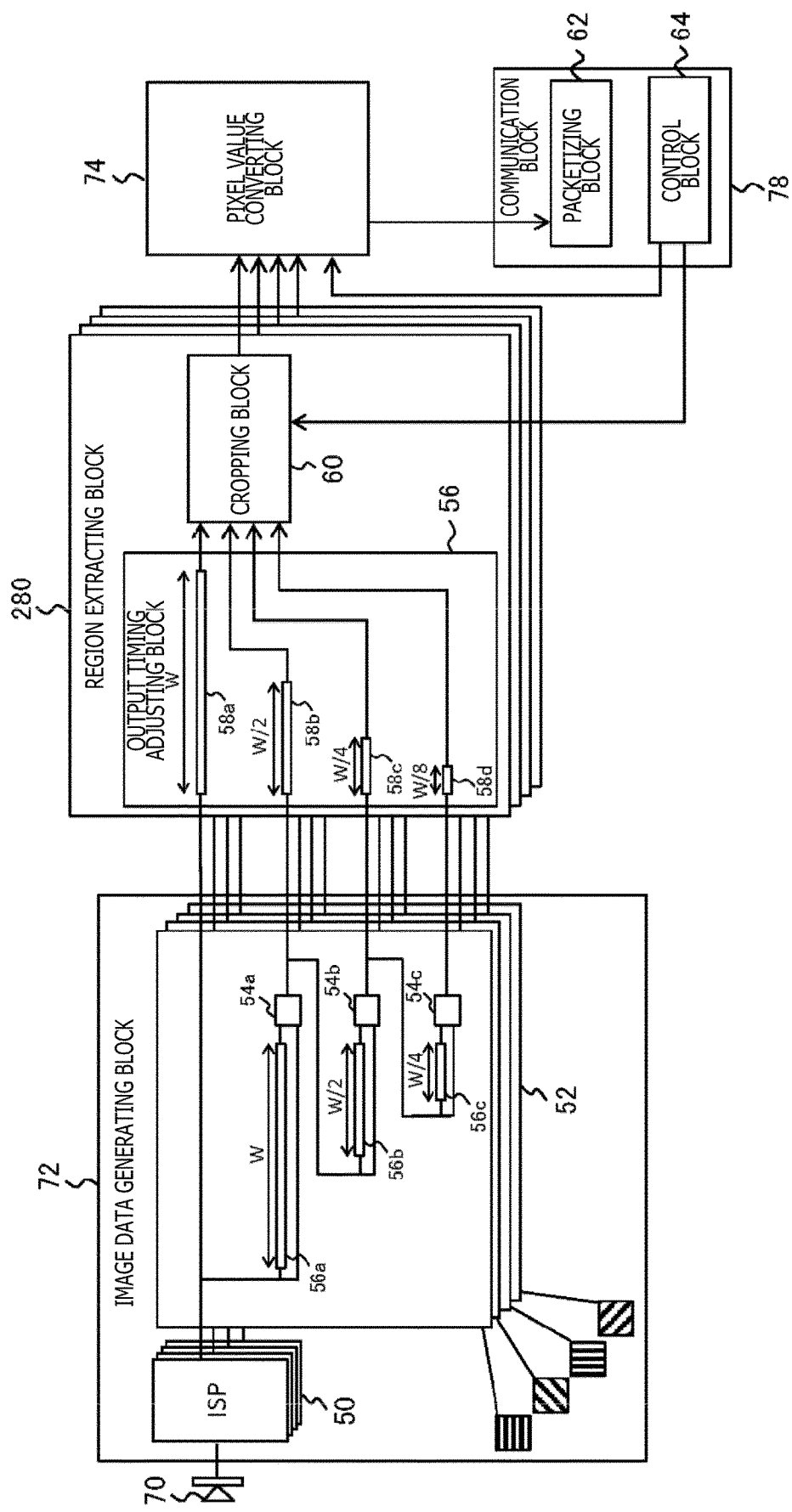
FIG. 16 is a diagram illustrating a variation of the configuration of the image capturing apparatus according to the present embodiment.

FIG. 16 is a diagram illustrating a variation example of the configuration of the image capturing apparatus 12 illustrated in FIG. 4 and FIG. 6. The image capturing apparatus 12 has a luminance data acquiring block 70, an image data generating block 72, a region extracting block 280, a pixel value converting block 74, and a communication block 78. Of these blocks, the luminance data acquiring block 70, the image data generating block 72, the pixel value converting block 74, and the communication block 78 have the same functions as those of the block illustrated in FIG. 6, so that these blocks have the common reference numerals. The region extracting block 280 basically has the same function as that of the transmission image generating block 76 illustrated in FIG. 6. In this example, however, the data of polarized images in four directions for each resolution generated by the image data generating block 72 is inputted in the region extracting block 280 before.

Then, after extracting a necessary region in the region extracting block 280, the pixel value converting block 74 generates the data necessary for this region. That is, while the transmission image generating block 76 illustrated in FIG. 6 also processes the images of various parameters acquired by use of the original polarized image, the region extracting block 280 illustrated in FIG. 16 directly processes the polarized image. Here, the region extracting block 280 has a configuration in which a set of an output timing adjusting block 56 for generating a synthesized image by cyclically connecting the images having two or more resolutions as described above and a cropping block 60 for cropping a region requested by the information processing apparatus 10 from the synthesized image is arranged for each polarization direction.

As a result, a data stream of the synthesized image obtained by connecting, according to predetermined rules, only the requested regions in the polarized image of each resolution is generated for each of the polarized components in four directions and the generated data streams are inputted in the pixel value converting block 74 in parallel. As with FIG. 6, the pixel value converting block 74 computes various parameters by use of the luminance of the polarized components in four directions and outputs the data requested by the information processing apparatus 10. In this case, however, since the target of processing is restricted to some regions on the image cropped in advance, the amount of computation in the pixel value converting block 74 and the amount of data transmission inside the image capturing apparatus 12 can be reduced as compared with the case illustrated in FIG. 6.

The data streams to be outputted from the pixel value converting block 74 to the communication block 78 are the same those to be outputted from the transmission image generating block 76 to the communication block 78 illustrated in FIG. 6. Therefore, as described above, the packetizing block 62 of the communication block 78 sequentially packetizes these data streams and transfers the resultant packets to the information processing apparatus 10. In response to the request from the information processing apparatus 10, the control block 64 notifies the cropping block 60 of the region extracting block 280 of the regions to be cropped from the polarized images having two or more resolutions and the pixel value converting block 74 of the type of the data to be outputted for each region.

Figure 17:
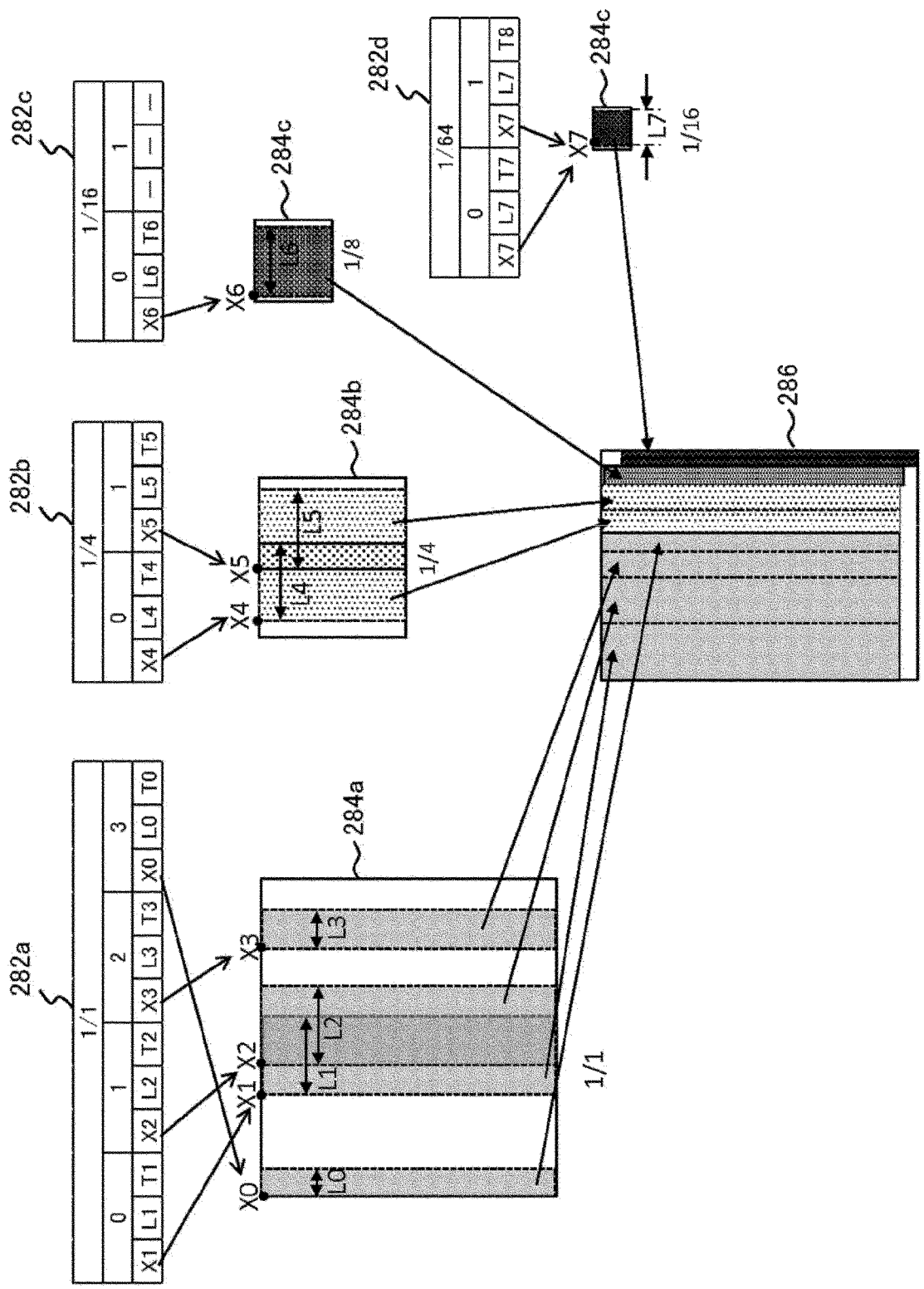
FIG. 17 is a diagram schematically illustrating an example of a structure of data to be stored in a register and a manner of processing to be accordingly executed by a cropping block according to the present embodiment.

Actually, the control block 64 stores the information with the regions to be cropped related with the type of the data to be outputted for these regions into the registers (not depicted) that the region extracting block 280 and the pixel value converting block 74 can commonly reference. FIG. 17 is a diagram schematically illustrating a structural example of the data to be stored in the register and a manner of the processing to be accordingly executed by the cropping block 60. First, a region for storing a dataset (cropping start point, cropping length, and parameter type) for each resolution is arranged in the register.

In the illustrated example, a register region 282a for storing four datasets having identification numbers "0" through "3" for a 1/1 image and registers 282b, 282c, and 282d for storing two data sets having identification numbers "0" and "1" for a ¼ image, a ⅟16 image, and a ⅟64 image, respectively, are arranged. However, the number of datasets to be stored is not restricted to those mentioned above. In this diagram, "cropping start points" indicated by X0, X1, . . . are the positional coordinates at the left end of the region to be cropped by the cropping block 60 on the axis in the horizontal direction of an image plane. It should be noted that cropping start points correspond to "X0," "X2," and so on illustrated in FIG. 10.

In the diagram, "cropping lengths" indicated by L0, L1, . . . are indicative of the widths to be cropped from the corresponding cropping start points X0, X1, . . . . As described above, since the cropping block 60 actually executes cropping on a data stream inputted from the output timing adjusting block 56, the cropping start point and the cropping length are indicative of the start position and length of a pixel line to be cropped that periodically appears in the data stream. The cropping start point and the cropping length are commonly read by the cropping blocks 60 in all polarization directions.

In the diagram, "parameter types" indicated by T0, T1, . . . are read by the pixel value converting block 74 and are indicative of the parameter type and the data length to be generated and outputted by use of the polarized luminance of corresponding regions. An example of the data structure of parameter type will be described later. In accordance with the setting of cropping start point and cropping length, the cropping block 60 crops the data from a stream inputted from the output timing adjusting block 56 and outputs the cropping results in the same manner as described with reference to FIG. 10.

In the example illustrated in the diagram, a region having cropping start point "X1" and cropping length "L1" set as a dataset having identification number "0" in the register region 282a for a polarized image 284a having 1/1 size is cropped. Next, a region having cropping start point "X2" and cropping length "L2" set as a dataset having identification number "1" in the register region 282a, a region having cropping start point "X3" and cropping length "L3" set as a dataset having identification number "2," and a region having cropping start point "X0" and cropping length "L0" set as a dataset having identification number "3" are cropped from the polarized image 284a having 1/1 size.

Here, as with the setting of datasets having identification numbers "2" and "3," the region to be cropped may be the same region as that in the original polarized image. This arrangement allows the generation and output of the data of two or more types for the same region by the pixel value converting block 74 of the subsequent stage. Further, the identification number of dataset identifies each region and, at the same time, specifies the sequence of output from the cropping block 60. In the diagram, the pixel line in the region having cropping start point "X0" positioned at the left end of the polarized image 284a is inputted earlier than the pixel line of the same line in another region from the output timing adjusting block 56; however, giving identification number "3" reverses the output sequence from the cropping block 60.

Thus, by the dataset identification numbers (or the sequence of register storing regions), the output sequence of cropped regions is controlled independently of the arrangement sequence on the original image plane. In this case, output timings may only be adjusted by the FIFO buffers 58a through 58d the output timing adjusting block 56 includes, or the buffers not depicted internally held by the cropping block 60. However, since the cropping and output are executed on a line-by-line basis as described above, the delay caused by this timing adjustment is minute.

For the polarized images 284b, 284c, and 284d having other resolutions, cropping and output are sequentially executed with the same setting. In the illustrated example, the dataset is set only to one of the storage regions for two datasets for the polarized image having 1/16 size. Thus, the necessary number of storage regions is set up to the limit of the number of storage regions arranged in the register. In some cases, no setting can also be executed for a polarized image having some resolution, thereby excluding the target to cropping.

Further, in the case illustrated in the diagram, the setting is made to crop the same regions in two datasets for a polarized image having 1/64 size. In this case, the cropping block 60 repetitively outputs the data of the same regions. On the other hand, as indicated in the diagram as "T7" and "T8," these two datasets may be made different from each other in parameter type for the pixel value converting block 74 to generate and output the data of two types for the same regions.

Actually, as described above, the data of a polarized image inputted from the output timing adjusting block 56 is in the state of a data stream with the pixel lines having two or more resolutions regularly connected. By following the setting of the register in which the contents of a request from the information processing apparatus 10 are stored, the cropping block 60 identifies the portions to be cropped from this data stream and sequentially outputs the cropped portions. As a result, as described with reference to FIG. 10, a new synthesized image 286 with the cropped region making up a rectangular region is outputted as a data stream. Thus, the data of the four synthesized images 286 made up of the same regions of each of the polarized images of each direction are outputted to be inputted in the pixel value converting block 74.

Figure 18:
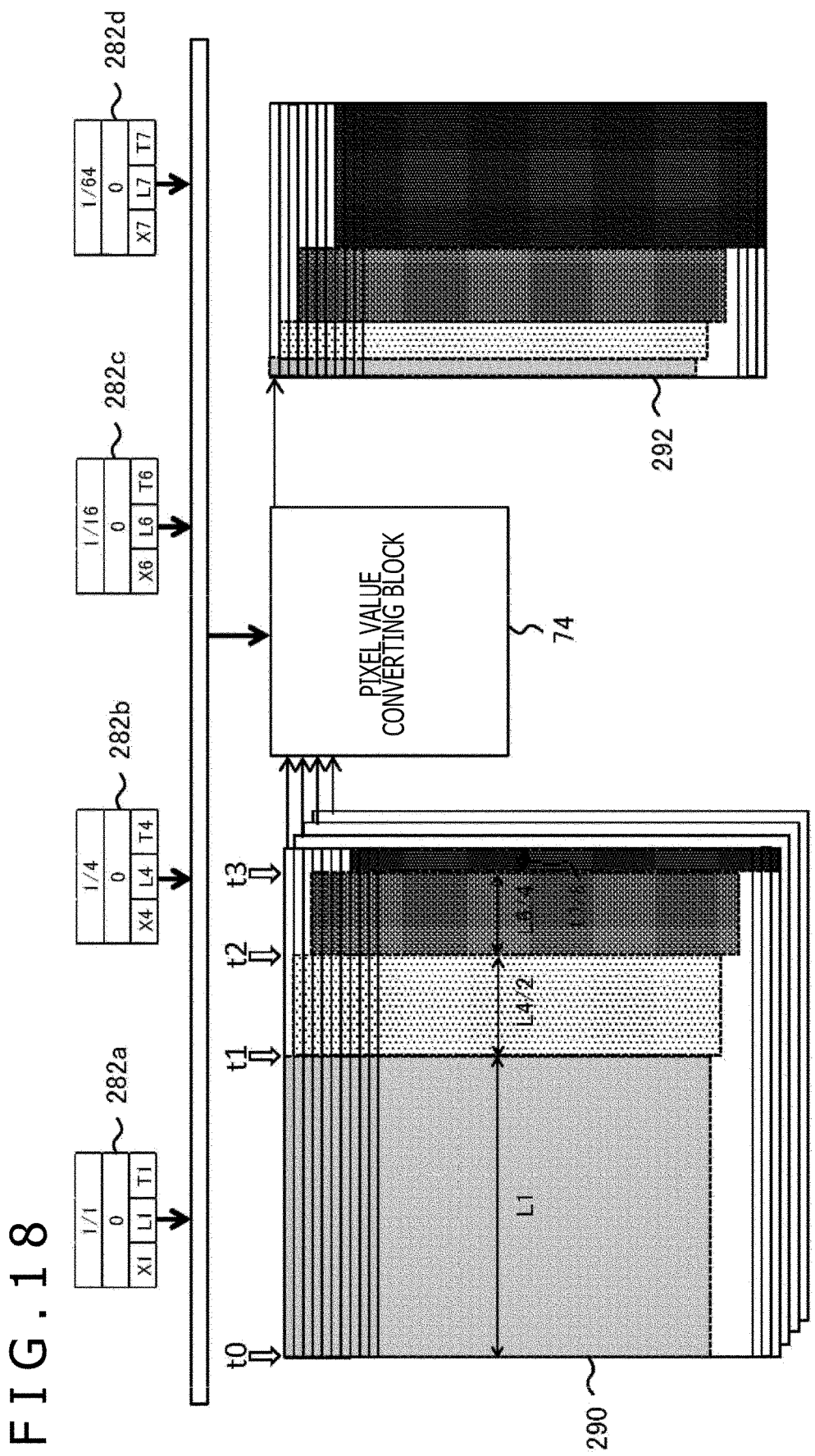
FIG. 18 is a diagram illustrating a manner in which the pixel value converting block outputs a data stream of a parameter specified by use of the data of an inputted polarized image.

FIG. 18 is a diagram illustrating a manner in which the pixel value converting block 74 outputs a data stream of specified parameters by use of the data of an inputted polarized image. In the diagram, a synthesized image 290 is obtained by cropping and outputting a data stream by the cropping block 60 of the region extracting block 280 as described above and expressing this data stream on a two-dimensional plane, this synthesized image corresponding to the synthesized image 286 illustrated in FIG. 17. In the diagram, however, one region is cropped for one resolution for the brevity of diagram. Therefore, it is assumed that only one dataset is stored in the register regions 282a, 282b, 282c, and 282d each corresponding to one resolution.

In this example, the data of the regions having widths L1, L4, L6, and L7 cropped from the polarized images having 1/1 size, 1/4 size, 1/16 size, and 1/64 size make up rectangular regions in a synthesized image 290. However, as described above, the data having 1/4 size, 1/16 size, and 1/64 size become rectangles having widths L4/2, L6/4, and L7/8, respectively, in the synthesized image 290. When the data of the synthesized image 290 corresponding to the four polarization directions are sequentially inputted starting from the pixel in the upper left, the pixel value converting block 74 generates and outputs the parameters in accordance with the parameter types set to the register region by use of the polarized luminance in the four directions of the same pixel.

The parameter types "T1," "T4," "T6," and "T7" are each set for each region. However, these notations are not meant to always make all of these parameter types different from each other. In the diagram, "t0," "t1," "t2," and "t3" are indicative of the timings with which to switch between the types of parameters to be outputted. The interval between these timings obviously depends on the cropping lengths "L1," "L4," "L6," and "L7" of the regions. Further, since the synthesized image 290 is inputted in the pixel value converting block 74 in the form of a data stream, the switching timing periodically comes for each line of the data stream.

In addition, since several lines at top and bottom of the synthesized image 290 include invalid data due to the timing of generating the original polarized luminance as described above, the pixel value converting block 74 also outputs the invalid data for the pixels corresponding thereto. As a result, if the number of pixels resulted from one cycle of the connection of the parameters of two or more types is defined as one horizontal line of the image, then the data stream outputted by the pixel value converting block 74 becomes a synthesized image 292 with each parameter making up a rectangular region. In the diagram, the synthesized image 292 is indicated with the data sizes per unit area integrated regardless of parameters.

In the present embodiment, each parameter outputted by the pixel value converting block 74 is variable in data length depending on type. Hence, the same number of pixels may have different data lengths of pixel lines for each region if the types of parameters are different. As a result, in the illustrated example, the synthesized image 290 of the original polarized image is different from the synthesized image 292 of outputted parameters in the configuration ratio of each region. For example, the setting that, while the data of 1/1 size outputs an 8-bit parameter per pixel, the data of 1/64 size outputs a 64-bit parameter per pixel reverses the area ratio.

The parameter type is set in a structure (the number of channels for each pixel, the data length for each channel, the type of parameter of each channel), for example. If the number of channels of each pixel value is three types of 1, 2, and 4 and the data length for each channel is two types of 8 bits and 16 bits, then the total of three bits are used in these settings. If the register capacity of parameter type is 16 bits, then the remaining 13 bits are allocated to the setting of the type of parameter to be outputted in each channel.

If the upper limit of the number of channels is 4, then allocating 4 bits to one channel and 3 bits to each of the remaining three channels and specifying a pre-assigned index to the type of parameter allow the specification of various parameters as illustrated in FIGS. 11 through 13 on a case-by-case basis. This arrangement allows the data regarding the parameters from 8 bits to 64 bits depending on type to be outputted from the pixel value converting block 74 in a sequence of pixel lines of the synthesized image 292. However, the setting scheme of parameter types is not restricted to that mentioned above. It should be noted that the techniques of setting cropping regions and parameter types are also applicable in the image capturing apparatus 12 illustrated in FIG. 6 in the same manner.

Figure 19:
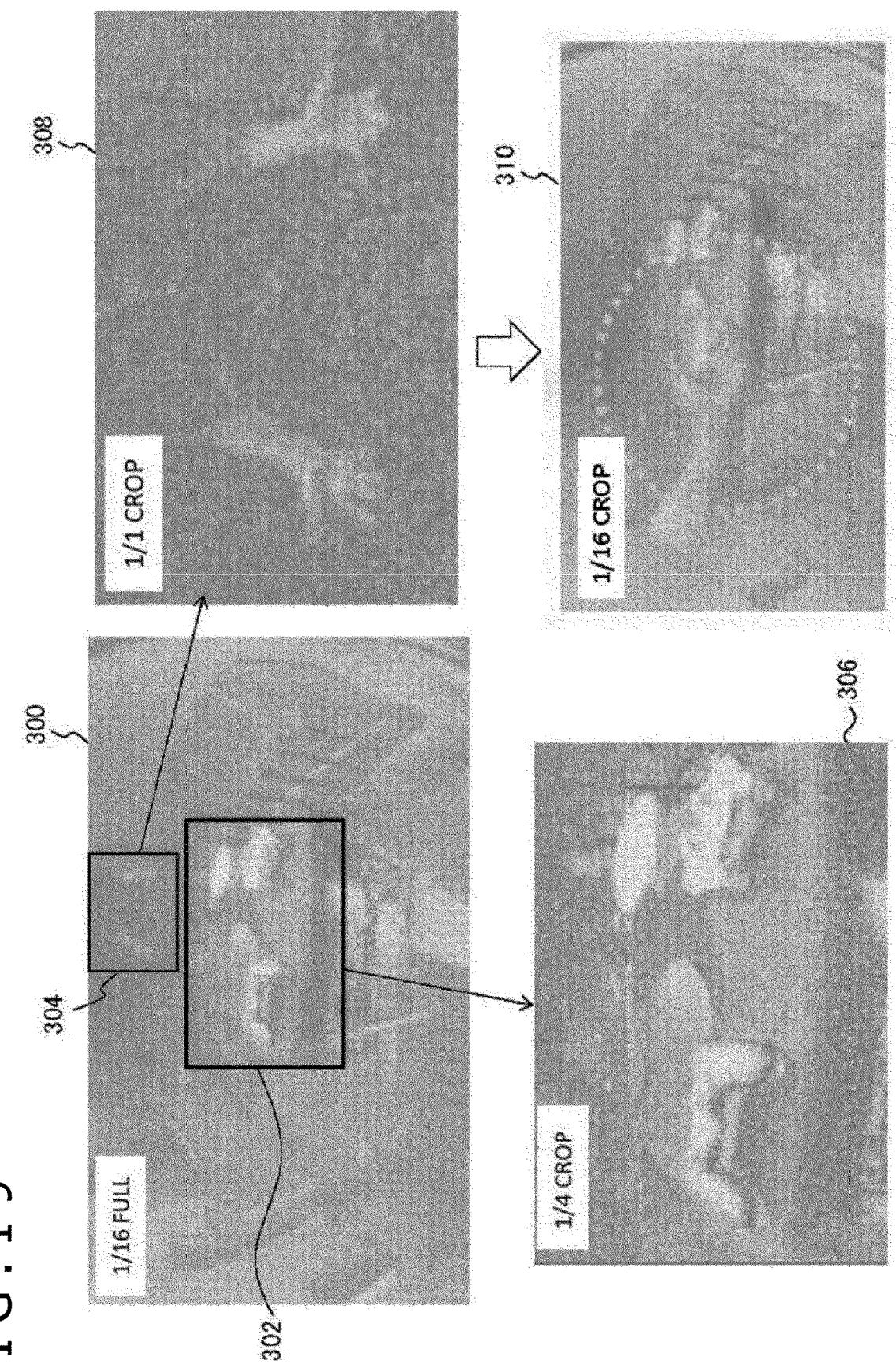
FIG. 19 is a diagram illustrating data to be sent in response to a request from the information processing apparatus according to the present embodiment.

FIG. 19 is a diagram illustrating data to be sent in response to a request by the information processing apparatus 10. However, for the ease of understanding, the transmission of various parameters and quantized data obtained from polarized luminance is also expressed in the original polarized image. In this example, the information processing apparatus 10 first requests for the data of entire vision field with a low resolution of 1/16 size. Then, by use of the image 300, matching processing and so on are executed so as to identify a partial region to be analyzed in detail. In the illustrated example, a region 302 that includes the images of game controllers and a region 304 that includes the images of hands are identified.

In response to this, the information processing apparatus 10 requests for the data of the regions 302 and 304. At this moment, a resolution to be requested is determined in accordance with the size of each region in the image 300 of the entire vision field and the contents of the processing to be executed on this region. In the illustrated example, the data of the resolutions corresponding to the ¼ size for the region 302 and the 1/1 size for the region 304 is requested. Then, the data (an image 306) of ¼ size and the data of a depth image separately generated from a stereo image for this region are integrated so as to generate a depth image of high precision.

A depth image is generally generated by extracting corresponding feature points in a stereo images and on the basis of a parallax thereof. Due to a load of the processing of extracting corresponding feature points by block matching or the like and the small number of feature points, it is often difficult to obtain depth values with a high resolution. Since the information regarding normal lines obtained from a polarized image is obtained on a pixel basis, this information may be integrated with the information regarding a depth image obtained with a course resolution so as to obtain a depth image with also curved surface forms correctly expressed. If the region of the image of a face is identified as a target object, generating a detail depth image in the same manner allows the recognition of countenance with high precision.

On the other hand, the data (an image 308) of high resolution of 1/1 size of the region 304 can be used for recognizing and tracking states of hand and finger in detail. For example, use of an image with the polarized luminance in three directions allocated to three channels of red, green, blue (RGB) also facilitates the identification of surface forms of arm and hand more than a natural-light captured image. Therefore, by use of such data, hand recognition and tracking can be executed with higher precision. Obviously, the information related with normal lines may be obtained so as to obtain state information in more detail.

Further, if it is found that a hand is approaching the image capturing apparatus 12 by tracking, the resolution of the data to be requested may be lowered. Approaching of a target object to the image capturing apparatus 12 can also be found by the size of a picture in a captured image. The example illustrated in the diagram is indicative that, because a hand has approached an image capturing apparatus, the target of request is changed to the data (an image 310) of 1/16 size for the region of hand so as to execute hand recognition and tracking by use of the changed request target.

As described above, adaptively switching between the resolution of the data to be requested and the range on image plane by the position of a target object and processing contents allows to restrict the amount of the data to be transmitted to a certain range. Further, since the simultaneous recognition of the states of a hand and a game controller allows the acquisition of such information in detail as the manipulation means of the game controller, the type of an executed manipulation, and so on, the contents of manipulation can be identified even if the configuration of the controller is simplified, thereby reducing the manufacture cost and power consumption.

Figure 20:
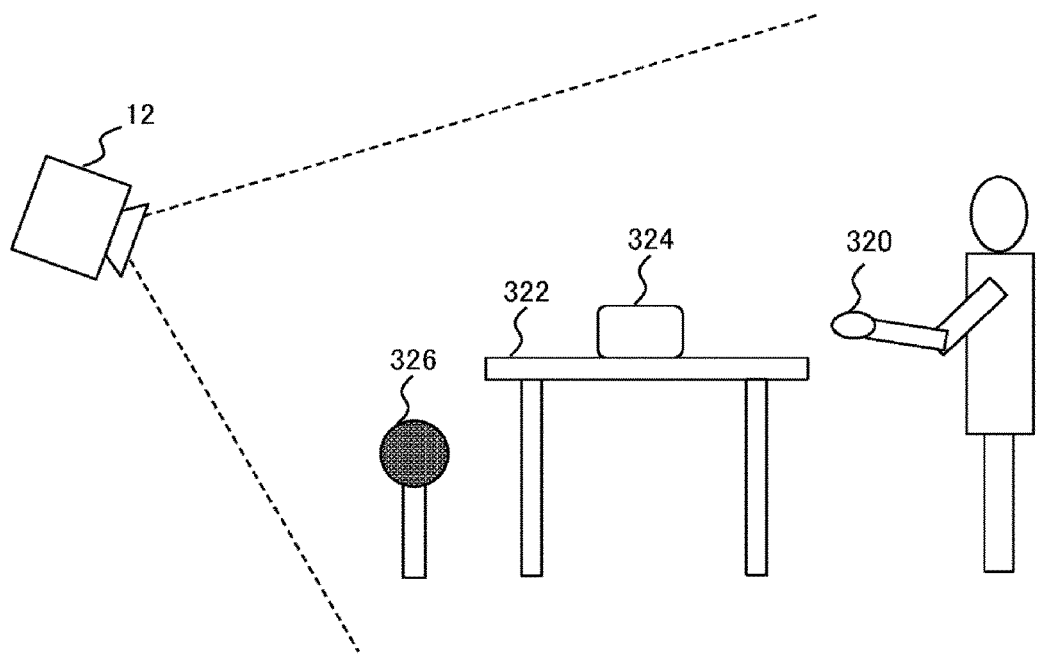
FIG. 20 is a diagram schematically illustrating a manner in which an image capturing environment is viewed sideways according to the present embodiment.

FIG. 20 is a diagram schematically illustrating a manner in which the image capturing environment for acquiring the data illustrated in FIG. 19 is seen sideways. In the vision field of the image capturing apparatus 12, there are a human hand 320, a table 322, and an object 324 placed on the table 322 such as a game controller such that these objects can be captured in an image 300. Further, in this diagram a reference real object 326 having known shape, color, material is placed within the vision field. In the case of this diagram, the reference real object 326 has a configuration in which a spherical body is mounted on rod-shaped leg but not restricted thereto.

The reference real object 326 is used to optimize such various conversion rules that may cause errors in output parameters as a conversion table for acquiring zenith angle θ from polarization degree ρ in the image capturing apparatus 12 and a code book for use in vector-quantization of zenith angle θ and azimuth angle α. The reference real object 326 is provided to the user along with a game controller, for example, thereby being placed by the user in the vision field of the image capturing apparatus 12 at the time of operation. Alternatively, the reference real object 326 may function also as a game controller at the same time.

Figure 21:
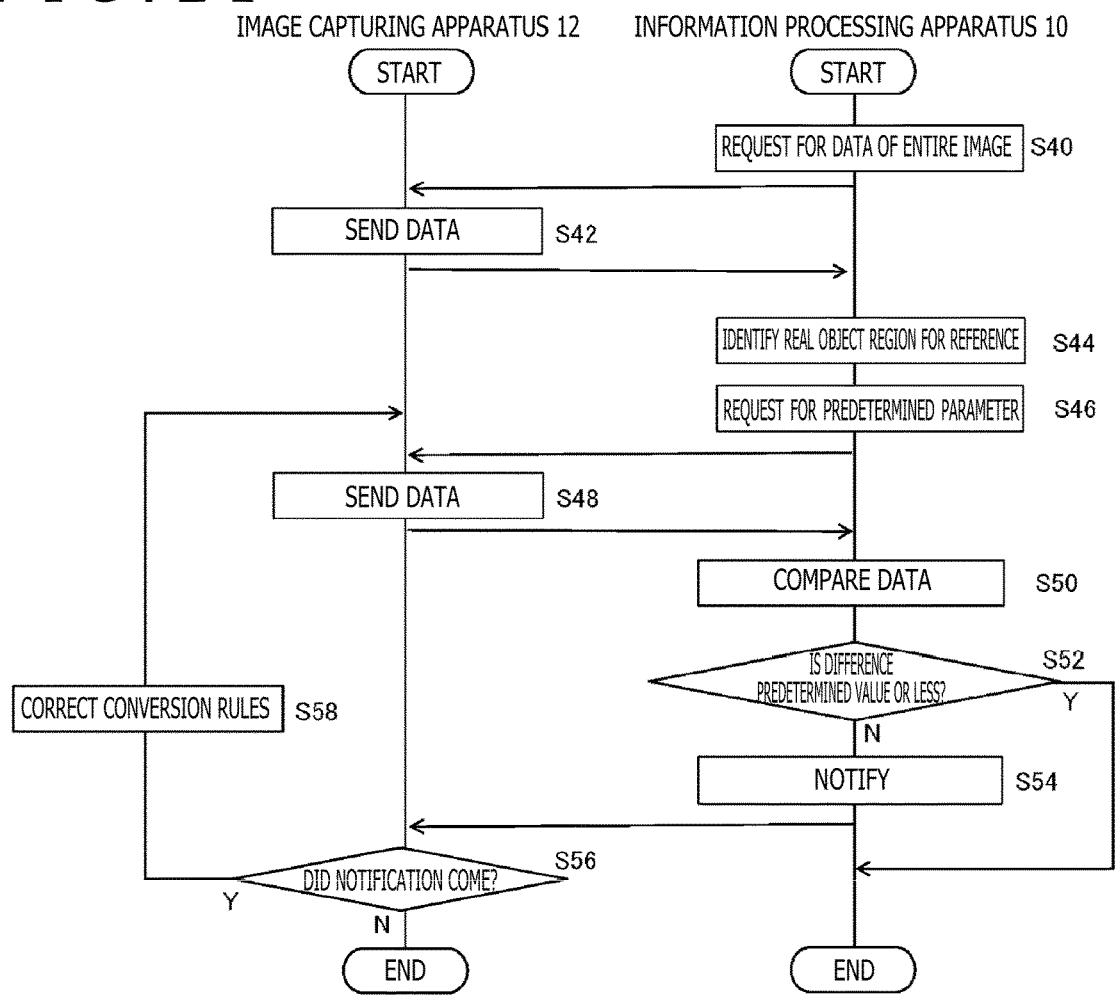
FIG. 21 is a flowchart indicative of a processing procedure for optimizing conversion rules in the image capturing apparatus by use of a reference real object according to the present embodiment.

FIG. 21 is a flowchart indicative of a processing procedure for optimizing the conversion rules in the image capturing apparatus 12 by use of the reference real object 326. First, the information processing apparatus 10 requests the image capturing apparatus 12 for a polarized image having a low resolution such as 1/16 size or the entire region of a non-polarized image, for example (S40). When the data concerned comes from the image capturing apparatus 12 (S42), the target object recognizing block 80 of the information processing apparatus 10 identifies a region in which the reference real object 326 from this entire region is imaged (S44).

Then, at least for this region, such data of the parameters to be acquired by the conversion rules to be optimized as the data of the zenith angle θ acquired inside the image capturing apparatus 12 or the data with zenith angle θ and azimuth angle α quantized are requested with a proper resolution (S46). If a parameter having a resolution different from the resolution of the image requested in S40 is requested, the data of the polarized image is requested with the same resolution. The image capturing apparatus 12 sends the requested data to the information processing apparatus 10 (S48). At this moment, parameters are generated by use of the conversion rules set as default.

The target object recognizing block 80 of the information processing apparatus 10 compares the data of the parameters sent from the image capturing apparatus 12 with the data of the parameters strictly acquired from the luminance of the polarized image (S50). For example, if zenith angle θ comparison is executed, the target object recognizing block 80 strictly acquires the zenith angle θ from equation 3 on the basis of the polarization degree ρ acquired from the polarized image. Further, alternatively, a phase angle that results in the maximum value or the minimum value of the polarized luminance depending on a reflection model to be employed, as azimuth angle α. If the color or material of the reference real object 326 are known, then the reflection model to be employed can be acquired with high precision. Since the shape is also known, the zenith angle θ and the azimuth angle α can be acquired with high precision.

Therefore, if a different is found between these pieces of data as a result of the comparison, then it is understood that the conversion rules used by the image capturing apparatus 12 are not proper. For example, if the difference in the zenith angle θ is found larger than a predetermined value, the conversion table for acquiring the zenith angle θ from the polarization degree ρ is determined not proper. If there is no difference in the zenith angle θ and there is a difference in the normal line vector acquired from the quantization index that is larger than a predetermined value, then the code book for quantizing the zenith angle θ and the azimuth angle α is determined not proper. At this moment, an angle difference may be acquired for each corresponding pixels so as to use an average value thereof as the comparison result or other statistical techniques may be used. It could be understood by those skilled in the art that there are various indexes for evaluating data distribution difference.

If the difference acquired as described above is found larger than a predetermined value (N of S52), then the target object recognizing block 80 notifies the image capturing apparatus 12 of this determination result (S54). If the different is found smaller than the predetermined value, the processing for optimizing the conversion rules is ended (Y of S52). When the notification that the conversion rules are not proper comes (Y of S56), the pixel value converting block 74 of the image capturing apparatus 12 corrects these conversion rules (S58). For example, the pixel value converting block 74 holds two or more conversion table candidates and code book candidates in an internal memory so as to switch between the candidates to be used. Alternatively, the internal settings may be gradually changed by following predetermined rules.

In S54, by making the information processing apparatus 10 give a notification of trends about a direction in which the zenith angle θ has an error, a portion of the reference real object 326 in which the normal vector has caused many errors, and so on, the direction of correction may be properly determined in the image capturing apparatus 12. The image capturing apparatus 12 computes parameters again by use of the conversion rules changed as described above and sends the computed parameters to the information processing apparatus 10 (S48). The information processing apparatus 10 executes a comparison between the parameters again (S50) and, if the difference is found larger than the predetermined value, gives a notification again (N of S52, and S54).

The image capturing apparatus 12 executes corrections on the conversion rules as long as there comes the notification from the information processing apparatus 10 (Y of S56, and S58); if there is no notification, the processing for optimizing the conversion rules is ended (N of S56). Since such correction processing may require time of some degree, this correction processing may be executed as calibration in the initial stage of starting a game or in the background during a game. For example, if the viewpoint changes in the case where the image capturing apparatus 12 is installed on a head-mounted display, the conversion rules may be adaptively switched according to the angle and distance of the reference real object 326 relative to the viewpoint.

As described above, by making the color and maternal known, the reference real object 326 can determine a reflection model for use in acquiring normal line vectors with precision. In the same principle, properly selecting the shape, color, and material of the reference real object 326 so as to correctly acquire normal line vectors also allows the correction of the conversion rules with precision. As a result, the precision of the state recognition of such objects as the hand 320, the table 322, and the object 324 on the table as illustrated in FIG. 20 that are other than the reference real object 326 can be enhanced.

Figure 22:
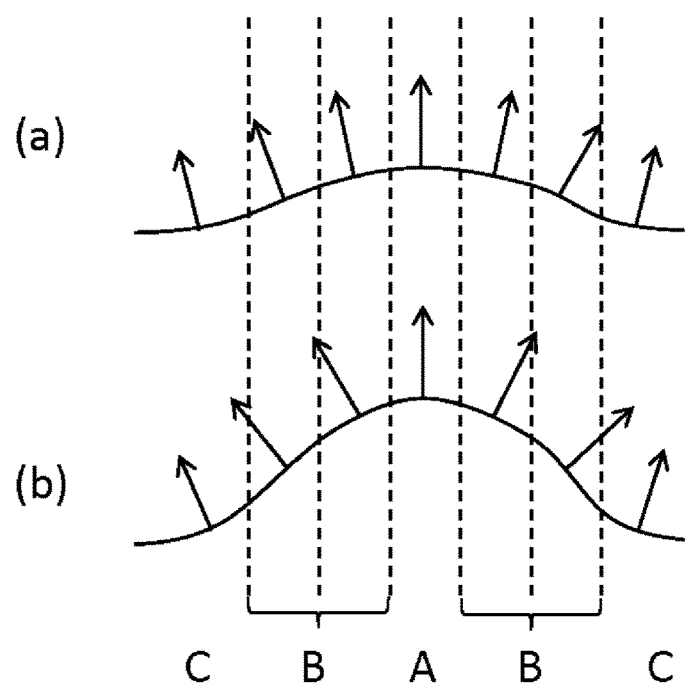
FIG. 22 is a diagram an example of further restricting the data to be sent from the image capturing apparatus according to the present embodiment.

FIG. 22 is a diagram illustrating an example in the data to be sent from the image capturing apparatus 12 is further restricted. The illustrated example assumes a mode in which the number of heart beats is monitored by a captured image of a human body, thereby schematically indicating the shape change on the skin surface caused by pulsation. Thus, the cross sectional shape of the skin alternately repeats (a) the state in which an upsurge is small and (b) the state in which an upsurge is large. Acquiring a normal lines by a polarized image allows the acquisition of the number of heart beats by the periodic variations of the acquired normal lines.

In the diagram, the normal line vectors are indicated by arrows. Comparison between the state of (a) and the state of (b) indicates that, while the normal line vectors present a small change in region A in the neighbor is the zenith of upsurge and surrounding region C, the normal line vectors present a large change in tilt region B in between. Such changes are observed by zenith angle θ. Therefore, while identifying the position of region B from a wide-area low-resolution image, the information processing apparatus 10 requests for the data of the zenith angle θ of a high resolution for this region. This arrangement allows the minimization of the amount of transfer data and the load of the processing in the information processing apparatus 10, thereby realizing the monitoring of the number of heart beats by use of a captured image with a low latency.

According to the present embodiment described so far, a mechanism for computing various parameters acquired from the luminance data of a polarized image is arranged in an image capturing apparatus so as to generate the data of pixel lines with these parameters used as pixel values. Further, a mechanism for generating polarized images with two or more resolutions and cropping a necessary region is also arranged so as to output combinations of resolutions, regions on an image, and types of parameters without restriction. This arrangement can enhance the efficiency of the processing of recognizing the states of a target object in an information processing apparatus.

In addition, since the necessary data is restrictively sent in accordance with the states of a target object on a moment-to-moment basis, the state recognition can be executed with precision without involving an increase in the amount of data transfer. For example, computing the zenith angle and the phase angle of a normal line in the image capturing apparatus in advance allows the information processing apparatus to use these angles so as to efficiently acquire the states of the target object. Capability of vector-quantizing the zenith angle and the phase angle depending on cases and sending the vector-quantized angles allows the sending of the optimum data in accordance with the priority of precision and transmission data amount on a case-by-case basis.

By making the data to be outputted by the image capturing apparatus independently computable on a pixel basis, the results can be outputted without destroying the processing form in the pixel line sequence with the luminance data acquired by an image capturing device. As a result, the latency due to the computation inside the image capturing apparatus can be minimized and, at the same time, the computational results can be handled in the same manner as related-art image data. Further, by use of the computed parameters, whether or not the reliability of normal lines of the pixel concerned and the angles of the normal lines satisfy predetermined conditions is identified and the results thereof are also transmitted. Referencing these items of data can enhance the efficiency of the processing in the information processing apparatus.

At the time of transmission, the processing of generating and outputting a virtual synthesized image with parameters of two or more types connected on a predetermined pixel line basis for each resolution is executed in the form of data streams. At this moment, connecting the data by proper rules according to a generation rate allows the realization of the transmission with a low latency and, at the same time, the reduction of the capacity of a memory to be installed on the image capturing apparatus. In addition, since the data of two or more types each configure a rectangular region in the synthesized image, only the particular data can easily be cropped by general cropping processing so as to facilitate the distinction between the data also in the information processing apparatus by re-connecting and outputting the cropped data.

Further, by use of a reference real object with the shape, color, and material thereof known, the conversion rules for acquiring various parameters for use inside the image capturing apparatus are optimized. Consequently, a real object recognition technology that is robust against the change in vision field in the case where the image capturing apparatus is installed on a head-mounted display and the change in such image capturing environment such as brightness can be realized.

While preferred embodiments of the present invention have been described using specific terms, such description is for illustrative purpose only, and it is to be understood by those skilled in the art that changes and variations may be made without departing from the spirit of the present invention.

REFERENCE SIGNS LIST

10 Information processing apparatus, 12 Image capturing apparatus, 16 Display apparatus, 50 ISP, 52 Pyramid filter block, 56 Output timing adjusting block, 60 Cropping block, 62 Packetizing block, 64 Control block, 70 Luminance data acquiring block, 72 Image data generating block, 74 Pixel value converting block, 76 Transmission image generating block, 78 Communication block, 80 Target object recognizing block, 82 Output data generating block, 84 Data storage block, 86 Communication block, 250 Computing block, 252 Transmission data forming block, 254 Computing block, 256 Transmission data forming block, 264 Reliability determining circuit, 266 Zenith angle acquiring circuit, 268 Azimuth angle acquiring circuit, 274 Quantizing block, 280 Region extracting block.

INDUSTRIAL APPLICABILITY

As described above, the present invention is applicable to an image capturing apparatus, a game apparatus, an image processing apparatus, a personal computer, a mobile terminal, and other various information processing apparatuses as well as an information processing system that includes these apparatuses.

The invention claimed is:

1. An image capturing apparatus comprising:
an image data acquiring block configured to acquire first data of polarized images in a plurality of polarization directions and generate second data expressed by a plurality of resolutions;
a pixel value converting block configured to acquire a predetermined parameter by use of a pixel value of said polarized images for each of said plurality of resolutions and generate third data that is a new pixel value; and
a communication block configured to send at least one of the second data or third data to an information processing apparatus,
wherein said pixel value converting block acquires a zenith angle and an azimuth angle of a normal line on a target object surface on a basis of pixel values of polarized images in the plurality of polarization directions and generates fourth data with an index acquired by quantizing a combination of the acquired angles used as a pixel value.

2. The image capturing apparatus according to claim 1, wherein said pixel value converting block acquires said parameter in a sequence of pixels of polarized images in the plurality of polarization directions inputted in parallel and outputs the acquired parameter; and
said communication block sends data of an image indicative of said parameter to said information processing apparatus in a sequence of inputted pixels.

3. The image capturing apparatus according to claim 1, wherein said pixel value converting block acquires a parameter necessary until a normal line on a target object surface from the polarized images in the plurality of polarization directions is determined.

4. The image capturing apparatus according to claim 3, wherein
said pixel value converting block determines a value indicative of a reliability of a normal line concerned on a basis of a parameter to determine a direction of a normal line on a target object surface and includes the determined value in data to be generated.

5. The image capturing apparatus according to claim 1, wherein
said pixel value converting block makes different a granularity that is a unit of quantization according to a range of the combination of said zenith angle and said azimuth angle.

6. The image capturing apparatus according to claim 1, wherein
said pixel value converting block makes different rules for acquiring said zenith angle of said normal line on the basis of the pixel values of said polarized images according to a resolution of a polarized image.

7. The image capturing apparatus according to claim 1, further comprising:
a region extracting block configured to crop and connect portions corresponding to regions to be sent to said information processing apparatus among data streams with data of polarized images,
wherein the regions are indicated by said plurality of resolutions cyclically connected for each direction of polarization on a pixel line basis for one horizontal line of an image or smaller, to form a new data stream to be inputted in said pixel value converting block.

8. The image capturing apparatus according to claim 7, wherein
said communication block accepts a transmission request for sending data specified with a region on an image plane from said information processing apparatus; and
said region extracting block switches between portions to be cropped from said new data stream in response to said transmission request.

9. The image capturing apparatus according to claim 7, wherein
said region extracting block crops, among said inputted data stream, a same portion a plurality of times according to setting and includes the cropped portion in a new data stream.

10. The image capturing apparatus according to claim 7, wherein,
in accordance with a request from said information processing apparatus, said pixel value converting block switches between types of data to be outputted for each region cropped by said region extracting block.

11. The image capturing apparatus according to claim 1, further comprising:
a transmission image generating block configured to crop and connect portions of data to be sent to said information processing apparatus among data streams with data of said polarized image and
with data of an image indicative of said parameter cyclically connected on a pixel line basis for one horizontal line of an image or smaller,
to form a new data stream to be sent from said communication block.

12. The image capturing apparatus according to claim 11, wherein
said communication block accepts a transmission request of data specified with a type of data and a region on an image plane from said information processing apparatus; and
said transmission image generating block switches between portions to be cropped from said new data stream in response to said transmission request.

13. The image capturing apparatus according to claim 12, wherein,
in a virtual synthesized image with a pixel line after one cycle of connection being a pixel line for one horizontal line, said transmission image generating block connects pixel lines such that data of each image makes up a rectangular region and, in accordance with a region specification in said synthesized image from said information processing apparatus, determines a portion to be cropped from said new data stream.

14. The image capturing apparatus according to claim 1, wherein,
in accordance with a request from said information processing apparatus, said pixel value converting block switches between types of data to be outputted.

15. An information processing system comprising:
an image capturing apparatus configured to capture a polarized image of a target object; and
an information processing apparatus configured to acquire a state of the target object by use of information acquired from the polarized image and execute information processing,
said image capturing apparatus comprising:
an image data acquiring block configured to acquire first data of polarized images in a plurality of polarization directions and generate second data expressed by a plurality of resolutions,
a pixel value converting block configured to acquire a predetermined parameter by use of a pixel value of said polarized images for each of said plurality of resolutions and generate third data that is a new pixel value, and
a communication block configured to send at least one of the second or third data to the information processing apparatus, and
said information processing apparatus comprising:
a target object recognizing block configured to acquire the state of the target object by use of data sent from said image capturing apparatus, and
a communication block configured to specify a type in accordance with the acquired state of the target object and in accordance with a region on an image plane so as to execute a transmission request for data to said image capturing apparatus,
wherein said target object recognizing block of said information processing apparatus compares a parameter acquired by said pixel value converting block of said image capturing apparatus with a same parameter acquired by the target object recognizing block concerned by use of a pixel value of said polarized image so as to determine an aptitude of conversion rules used by said pixel value converting block for acquiring the parameter concerned and, if said conversion rules are found inappropriate, notifies said image capturing apparatus of the inappropriate conversion rules; and
wherein a pixel value converting block of said image capturing apparatus corrects said conversion rules in accordance with the notification concerned.

16. A polarized image processing method to be executed by an image capturing apparatus, the method comprising:
acquiring first data of polarized images in a plurality of polarization directions by an image capturing device and to generate second data expressed by a plurality of resolutions;
acquiring a predetermined parameter by use of a pixel value of said polarized images for each of said plurality of resolutions and to generate data that is a new pixel value; and
sending at least one of the second data or third data to an information processing apparatus,
acquiring a zenith angle and an azimuth angle of a normal line on a target object surface on a basis of pixel values of polarized images in the plurality of polarization directions; and
generating fourth data with an index acquired by quantizing a combination of the acquired angles used as a pixel value.

17. A non-transitory computer readable storage medium having stored thereon a computer program comprising:
an image data acquiring block configured to acquire first data of polarized images in a plurality of polarization directions and generate first data expressed by a plurality of resolutions;
a pixel value converting block configured to acquire a predetermined parameter by use of a pixel value of said polarized images for each of said plurality of resolutions and generate third data that is a new pixel value;
a communication block configured to send at least one of the second data or third data to an information processing apparatus, and
a region extracting block configured to crop and connect portions corresponding to regions to be sent to said information processing apparatus among data streams with data of polarized images,
wherein the regions are indicated by said plurality of resolutions cyclically connected for each direction of polarization on a pixel line basis for one horizontal line of an image or smaller, to form a new data stream to be inputted in said pixel value converting block.

* * * * *